(12) United States Patent
Krishnamurthy et al.

(10) Patent No.: US 7,751,325 B2
(45) Date of Patent: Jul. 6, 2010

(54) METHOD AND APPARATUS FOR SKETCH-BASED DETECTION OF CHANGES IN NETWORK TRAFFIC

(75) Inventors: Balachander Krishnamurthy, New York, NY (US); Subhabrata Sen, Chatham, NJ (US); Yin Zhang, Austin, TX (US); Yan Chen, Evanston, IL (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1181 days.

(21) Appl. No.: 10/867,265

(22) Filed: Jun. 14, 2004

(65) Prior Publication Data

US 2005/0039086 A1 Feb. 17, 2005

Related U.S. Application Data

(60) Provisional application No. 60/495,314, filed on Aug. 14, 2003.

(51) Int. Cl.
*G01R 31/08* (2006.01)
(52) U.S. Cl. ..................... 370/233; 370/253
(58) Field of Classification Search .............. 370/233
See application file for complete search history.

(56) References Cited

U.S. PATENT DOCUMENTS

| | | | |
|---|---|---|---|
| 4,769,761 A | 9/1988 | Downes et al. | |
| 6,032,125 A * | 2/2000 | Ando | 705/10 |
| 6,269,362 B1 | 7/2001 | Glassman | |
| 6,324,601 B1 * | 11/2001 | Webber et al. | 710/54 |
| 6,480,810 B1 | 11/2002 | Cardella et al. | |
| 6,611,726 B1 * | 8/2003 | Crosswhite | 700/99 |
| 6,731,990 B1 | 5/2004 | Carter et al. | |
| 6,928,472 B1 * | 8/2005 | Wen | 709/223 |
| 7,068,998 B2 * | 6/2006 | Zavidniak | 455/410 |
| 7,150,044 B2 * | 12/2006 | Hoefelmeyer et al. | 726/23 |
| 7,158,961 B1 * | 1/2007 | Charikar | 707/2 |
| 7,246,370 B2 * | 7/2007 | Valente et al. | 726/1 |
| 2002/0181419 A1 * | 12/2002 | Zhang et al. | 370/331 |

(Continued)

FOREIGN PATENT DOCUMENTS

EP    1206085 A    5/2002

OTHER PUBLICATIONS

Das, A. Nguyen, D. Zambreno, J. Memik, G. Choudhary, A.; An FPGA-Based Network Intrusion Detection Architecture, Mar. 2008, IEEE, IEEE Transactions on Information Forensics and Security, vol. 3, Issue: 1, p. 118-132.*

*Primary Examiner*—Jayanti K Patel
*Assistant Examiner*—Hooman Houshmand

(57) ABSTRACT

A sketch-based change detection technique is introduced for anomaly detection. The technique is capable of detecting significant changes in massive data streams with a large number of network time series. As part of the technique, we designed a variant of the sketch data structure, called k-ary sketch, uses a constant, small amount of memory, and has constant per-record update and reconstruction cost. A variety of time series forecast models are implemented on top of such summaries and detect significant changes by looking for flows with large forecast errors. Heuristics for automatically configuring the forecast model parameters are presented. Real Internet traffic data is used to demonstrate and validate the effectiveness of sketch-based change detection method for utilization as a building block for network anomaly detection and traffic measurement in large computer networks.

19 Claims, 19 Drawing Sheets

U.S. PATENT DOCUMENTS

2004/0193451 A1* 9/2004 McNair .......................... 705/2
2006/0004897 A1* 1/2006 Nadj et al. ................... 707/206
2006/0167704 A1* 7/2006 Nicholls et al. ................ 705/1
2008/0320585 A1* 12/2008 Ansari et al. ................... 726/13
2009/0031175 A1* 1/2009 Aggarwal et al. ............. 714/47

* cited by examiner

*FIG. 18*

| OPERATIONS | RUNNING TIME (SEC) | |
|---|---|---|
| | COMPUTER A | COMPUTER B |
| COMPUTE 8 16-BIT HASH VALUES | 0.34 | 0.89 |
| UPDATE (H = 5, K = $2^{16}$) | 0.81 | 0.45 |
| ESTIMATE (H = 5, K = $2^{16}$) | 2.69 | 1.46 |

METHOD AND APPARATUS FOR SKETCH-BASED DETECTION OF CHANGES IN NETWORK TRAFFIC

CROSS-REFERENCE TO RELATED APPLICATIONS

This application claims priority under 35 U.S.C. §119(e) to U.S. Provisional Patent Application Ser. No. 60/495,314 entitled METHOD FOR SKETCH-BASED CHANGE DETECTION filed in the name of Balachander Krishnamurthy on Aug. 14, 2003, the entirety of which is hereby incorporated by reference.

FIELD OF THE INVENTION

This invention generally relates to multiple computer or process coordinating, and in particular it relates to computer network monitoring.

BACKGROUND OF THE INVENTION

Traffic anomalies such as failures and attacks are commonplace in today's network, and identifying them rapidly and accurately is critical for large network operators. The detection typically treats the traffic as a collection of flows that need to be examined for significant changes in traffic pattern (e.g., volume, number of connections). However, as link speeds and the number of flows increase, keeping per-flow state is either too expensive or too slow.

Traffic anomalies are an integral part of daily life for today's network operators. Some traffic anomalies are expected or unanticipated but tolerable. Others are often indications of performance bottlenecks due to flash crowds, network element failures, or malicious activities such as denial of service (DoS) attacks and worms. Suitable motivation exists to process massive data streams (available from diverse sources) quickly, in order to examine them for anomalous behavior. Two basic approaches to network anomaly detection are common.

The first approach is the "signature-based" approach, which detects traffic anomalies by looking for patterns that match signatures of known anomalies. For example, such techniques may infer DoS activities based on address uniformity, a property shared by several popular DoS toolkits. Signature-based methods have been extensively explored in the literature and many software systems and toolkits. One limitation of this approach is the requirement that the anomaly signatures be known in advance. Thus, it cannot be applied to identify new anomalies. Also, a malicious attacker can evade signature-based detection systems by altering their signatures. One can see a parallel in the failure of filter-based, spam-fighting systems where spammers introduce random hashes in their spam messages.

A second approach is the "statistics-based" approach, which does not require prior knowledge about the nature and properties of anomalies and therefore can be effective even for new anomalies or variants of existing anomalies. A very important component of the statistics-based approach is change detection. It detects traffic anomalies by deriving a model of normal behavior based on the past traffic history and looking for significant changes in short-term behavior (on the order of minutes to hours) that are inconsistent with the model.

Change detection has been extensively studied in the context of time series forecasting and outlier analysis. The standard techniques include different smoothing techniques (such as exponential smoothing or sliding window averaging), Box-Jenkins AutoRegressive Integrated Moving Average (ARIMA) modeling, and finally the more recent wavelet-based techniques.

Prior works have applied these techniques to network fault detection and intrusion detection. Examples in fault detection include: those that identify faults based on statistical deviations from normal traffic behavior; methods of identifying aberrant behavior by applying thresholds in time series models of network traffic; methods for intrusion detection including neural networks, Markov models, and clustering; and those that provide a characterization of different types of anomalies and propose wavelet-based methods for change detection.

Unfortunately, existing change detection techniques typically only handle a relatively small number of time series. While this may suffice for detecting changes in highly aggregated network traffic data (e.g., Simple Network Management Protocol (SNMP) link counts with a 5 minute sample interval), they cannot scale up to the needs at the network infrastructure (e.g., Internet Service Provider (ISP)) level. At an ISP level, traffic anomalies may be buried inside the aggregated traffic, mandating examination of the traffic at a much lower level of aggregation (e.g., Internet Protocol (IP) address level) in order to expose them.

Given today's traffic volume and link speeds, a suitable detection method has to be able to handle potentially several millions or more of concurrent network time series. Directly applying existing techniques on a per-flow basis cannot scale up to the needs of such massive data streams. Some recent research efforts have been directed towards developing scalable "heavy-hitter" detection techniques for accounting and anomaly detection purposes. However, heavy-hitter techniques do not necessarily correspond to flows experiencing significant changes and thus it is not clear how their techniques can be adapted to support change detection.

Accordingly, there is a need for an efficient, accurate, and scalable change detection mechanism for detecting significant changes in massive data streams with a large number of flows.

SUMMARY OF THE INVENTION

It is an object of the present disclosure, therefore, to introduce methods implemented on various apparatus in which compact summaries of the traffic data are built using sketches. In particular, a variant of the sketch data structure, k-ary sketch, is introduced. K-ary sketch uses a constant, small amount of memory, and has constant per-record update and reconstruction cost. Its linearity property enables the summarization of traffic at various levels. A variety of time series forecast models (ARIMA, Holt-Winters, etc.) are then implemented on top of such summaries that detect significant changes by looking for flows with large forecast errors. Heuristics for automatically configuring the model parameters are also introduced.

Using a large amount of real Internet traffic data from an operational tier-1 ISP, the sketch-based change detection method is shown to be highly accurate, and can be implemented at low computation and memory costs. The results indicate that the disclosed methods may be reliably used for network anomaly detection and traffic measurement.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 18 depicts a table summarizing the impact of hash computations and sketch functions on computing times in separate computing systems that may be used in the network of FIG. 1.

DETAILED DESCRIPTION OF THE SPECIFIC EMBODIMENTS

In the database research community, computation over massive data streams has been an active research area over the past several years. The emerging field of data stream computation deals with various aspects of computation that can be performed in a space- and time-efficient fashion when each tuple in a data stream can be touched only once (or a small number of times).

One particularly powerful technique is "sketch," a probabilistic summary technique proposed for analyzing large streaming datasets. Sketches avoid keeping per-flow state by dimensionality reduction, using projections along random vectors. Sketches have some interesting properties that have proven very useful in data stream computation: they are space efficient, provide provable probabilistic reconstruction accuracy guarantees, and are linear (i.e., sketches can be combined in an arithmetical sense).

A sketch-based change detection process will now be introduced wherein data stream computation techniques are incorporated into change detection, such that detection of significant changes in massive data streams with a large number of network time series is accommodated. With sketch-based change detection, compact summaries of the traffic data are generated using sketches. A variant of the sketch data structure introduced herein, named "k-ary sketch," uses a constant, small amount of memory, and has constant per-record update and reconstruction cost. A variety of time series forecast models (ARIMA, Holt-Winters, etc.) may be implemented on top of such summaries and detect significant changes by looking for flows with large forecast errors. Being able to compute significant differences in the list of top flows quickly can point towards potential anomalies. Depending on the length of the time period for which forecasts are computed and the duration of significant changes, the process can accurately identify the presence of an anomaly. Note that an anomaly can be a benign surge in traffic (like a flash crowd) or an attack. Heuristics for configuring the model parameters are likewise introduced.

A large amount of real Internet traffic data was used to demonstrate that the sketch-based change detection method is highly accurate when compared with per-flow analysis, and can be implemented at lower computation and memory costs. Evaluations show that lists of the top flows in a time period may be reconstructed efficiently and accurately, resulting in similar forecast errors when compared with per-flow techniques. This method can thus readily serve as a foundation for network anomaly detection.

Referring now to FIGS. 1-18, wherein similar components of the present disclosure are referenced in like manner, various embodiments of a method and apparatus for sketch-based detection of changes in network traffic are disclosed.

Figure 1:
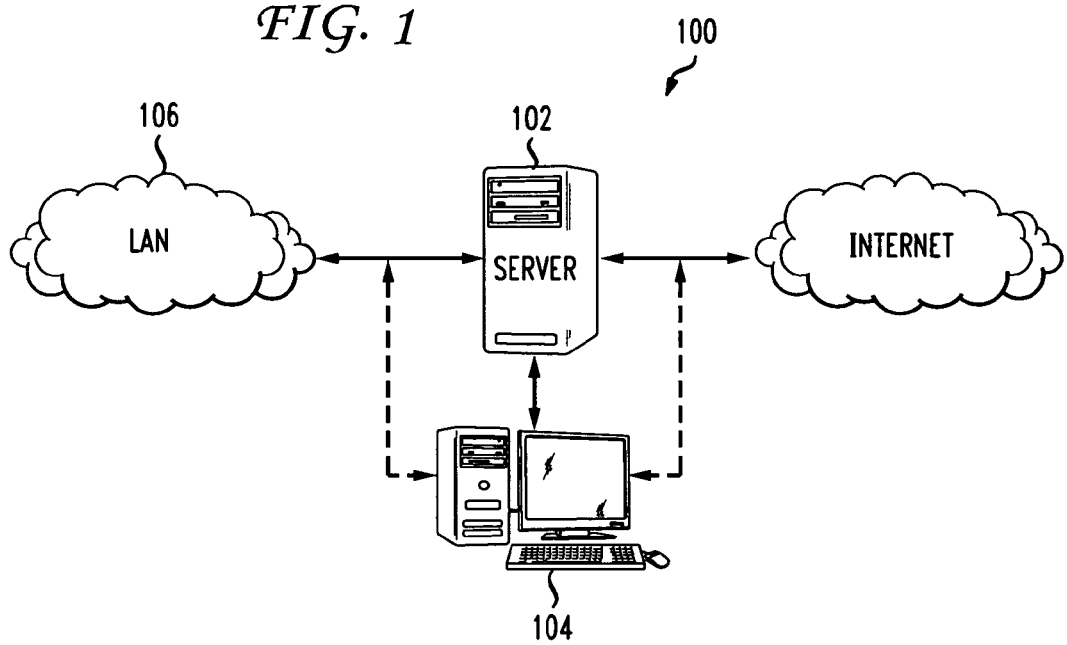
FIG. 1 is a block diagram of a computer network within which the processes disclosed herein may be performed.

FIG. 1 depicts an exemplary computing environment 100 in which the processes of the present disclosure may be performed. As one possible implementation, a server 102, such as an enterprise network server of the type commonly manufactured by IBM or a group of distributed servers, is implemented as a gateway between a local area network (LAN) 106, and a broader computing environment such as the Internet. The process may be implemented directly by the server 102, or may instead be implemented on a separate computing device 104, such as a personal computing terminal, computer workstation or separate dedicated server(s) tasked with monitoring incoming data flow. In such embodiments, the computing device 104 may receive data flow input prior to the server 102, in parallel with the server 102 or after the server 102 as shown.

The LAN 106 may be a corporate network environment or the like and may include any small to large sized distinct operating one or more computing environments and one or more network protocols. In a particular embodiment, server 102, terminal 104 and LAN 106 are operated by an Internet Service Provider or the like, which are frequent targets of DoS attacks and other traffic anomalies. Other implementations of the computing environment 100 may likewise be accommodated.

Figure 2:
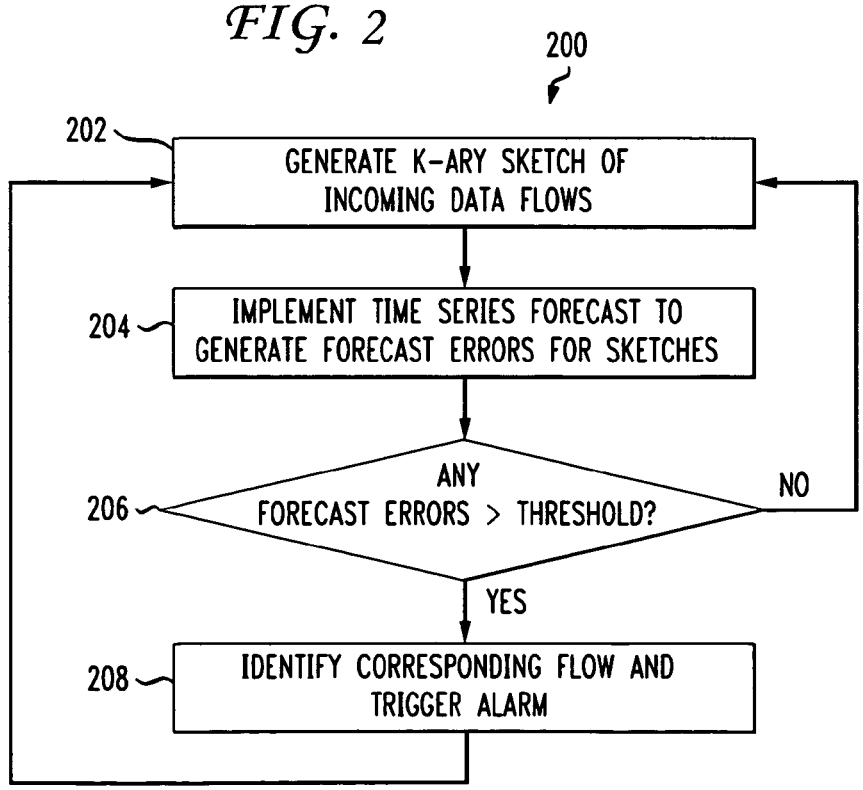
FIG. 2 is a flowchart of an exemplary sketch-based anomaly detection process performed over the computer network of FIG. 1.

The operation of the sketch-based change detection process 200, after installation on the server 102 or the computing device 104, is summarized in the flowchart of FIG. 2. According to the process 200, a k-ary sketch of incoming data flows is generated for selected continuous time intervals (step 202). Time series forecasting is implemented to generate forecast sketches and forecast errors for each k-ary sketch (step 204). If any forecast errors exceed an established threshold value (step 206), the process identifies the anomalous flow and triggers an alarm condition (step 208). Otherwise, the monitoring of incoming data flows continues.

Particular implementations of steps 202-206 will be described in the following detailed discussions in which an overview of the available framework of the sketch-based change detection process is presented, followed by detailed discussions of the contemplated software modules for implementing the process 200, experimental setups for testing the process 200, and results of testing of sketch-based change detection process 200 on different large and real datasets.

Over the past several years, various models have been proposed to describe data streams, including the Time Series Model, The Cache Register Model, and the Turnstile Model. The most general one, the Turnstile Model, has been assumed in the discussions that follow, though other such models may likewise be accommodated. According to the selected model, let I=$a_1, a_2, \ldots$, be an input stream that arrives sequentially, item by item. Each item $a_i=(a_i, u_i)$ consists of a key $$a_i \in [u] \stackrel{def}{=} \{0, 1, \ldots, u-1\},$$

and a (possibly negative) update $u_i \in R$. Associated with each key $a \in [u]$ is a time varying signal $A[a]$. The arrival of each new data item $(a_i, u_i)$ causes the underlying signal $A[a_i]$ to be updated: $A[a_i]+=u_i$. The goal of change detection is to identify all such signals with significant changes in their behavior.

The Turnstile model can be instantiated in many ways with specific definitions of the key values and update values. In the context of network anomaly detection, the key can be defined using one or more fields in packet headers of data items from an input data stream, such as source and destination IP addresses, source and destination port numbers, protocol number, and the like. It is also possible to define keys with parameter values like network prefixes or Autonomous System (AS) numbers to achieve higher levels of aggregation.

The update value can be the size of a packet, the total bytes or a number of data packets in a flow (when flow-level data is available). To keep the parameter space within a manageable size, however, destination IP version 4 (Ipv4) address and bytes are readily used as the key value and the update value, respectively. Alternative choice of key and update values may be also used, some of which may impact the running time of the process 200 on a computing device.

In an ideal environment with infinite resources, one could perform time series forecasting and change detection on a per-flow basis. Specifically, time may divided into discrete intervals $I_1, I_2, \ldots$. For each time interval $I_t$, and each signal $A[a]$ that appears before or during interval $I_t$, an observed value can be computed as the total update to $A[a]$ during interval $I_t$: $O_a(t)=\Sigma_{i \in A_a(t)} Ui$, where the set of indices $$A_a(t) \stackrel{def}{=} \{i \mid a_i = a \wedge (a_i, u_i)\}$$

arrives during $I_t$. The forecast value $f_a(t)$ can then be determined by applying a forecasting model to observed values in the past intervals. The forecast error $e_a(t)=o_a(t)-f_a(t)$ can then be determined and an alarm indicated whenever $e_a(t)$ is significant according to certain detection criteria.

In the real world, however, and as stated previously, per-flow analysis can be prohibitive because the number of signals present in the incoming data flow can be very large. For instance, if source and destination IPv4 addresses are used as the key, the key space [u] can be as large as $2^{64}$, and the number of signals can easily reach tens of millions given today's traffic volume and link speeds. Hence it can be too slow or too expensive to perform change detection on a per-flow basis.

The solution presented herein is to create sketches to summarize the input stream and then implement various forecasting models on top of the sketches. The sketch-based change detection process 200 may be implemented as the following three basic modules: a Sketch module, a Forecasting module, and a Change Detection module.

The sketch module creates a space- and time-efficient sketch (the observed sketch $S_o(t)$) to summarize all the observed values $o_a(t)$ (total update to signal $A[a]$) during each time interval $I_t$. The forecasting module produces a forecast sketch $S_f(t)$ using some forecasting models based on observed sketches in the past intervals. It then computes the forecast error sketch $S_e(t)$ as the difference between $S_o(t)$ and $S_f(t)$, i.e., $S_e(t)=S_o(t)-S_f(t)$. The linearity of the sketch data structure allows us to implement various forecasting models and compute the forecast error directly at the sketch level. The change detection module uses the error sketch $S_e(t)$ to identify significant (i.e., anomalous) changes. The functions performed by these modules will now be described in turn.

Let $(a_1, u_1), (a_2, u_2) \ldots$ be an input stream (for example, the substream of A that is observed during a given time interval). For each key $a \in [u]$, let $v_a=\Sigma_{i \in A_a} u_i$, where the set of indices $$A_a \stackrel{def}{=} \{i \mid a_i = a\}.$$

For each interval, the "second moment" ($F_2$) is defined as the sum of squares of the values associated with all the keys, i.e., $$F_2 \stackrel{def}{=} \sum_a v_a^2.$$

We refer to the square root of the second moment ($\sqrt{F_2}$) as the "L2 norm."

The sketch module uses the sketch data structure to summarize all the $v_a$ in each time interval. Sketch is a probabilistic summary data structure based on random projections. We have designed a variant of the sketch data structure, which we call the "k-ary sketch." The k-ary sketch is similar to the count sketch data structure recently proposed by others. However, the most common operations on k-ary sketch use simpler operations and are more efficient than the corresponding operations defined on count sketches.

Just like the count sketch, a k-ary sketch S consists of a H×K table of registers: $Ts[i][j] (i \in [H], j \in [K])$. Each row $Ts[i][\bullet] (i \in [H])$ is associated with a hash function from [u] to [K]: $h_i$. The data structure for any k-ary sketch may then be viewed as an array of hash tables. The hash functions are required to be 4-universal in order to provide probabilistic guarantees of reconstruction accuracy. They may be constructed using a fast tabulation-based method. Different $h_i$ are constructed using independent seeds, and are therefore independent.

There are four basic operations defined for k-ary sketches: (1) UPDATE to update a sketch, (2) ESTIMATE to reconstruct $v_a$ for a given key a, (3) ESTIMATEF2 to estimate the second moment $F_2$, and (4) COMBINE to compute the linear combination of multiple sketches. These operations are used in various modules of the change detection process 200: UPDATE in the sketch module to update the observed sketch $S_o(t)$; COMBINE in the forecasting module to implement various forecasting models and to compute the forecast sketch $S_f(t)$ and forecast error sketch $S_e(t)$; ESTIMATE in the change detection module to reconstruct forecast errors from $S_e(t)$; and ESTIMATEF2 in the change detection module to choose the threshold for judging whether forecast errors are significant.

One formal specification of these operations is as follows:

1. UPDATE(S,a,u): For $\forall i \in [H]$, $T_S[i][h_i(a)] += u$.

2. ESTIMATE($S^i$, a): Let $sum(S) = \Sigma_{i \in [K]} T_S[0][j]$ be the sum of all values in the sketch, which only needs to be computed once before any ESTIMATE($S^i$, a) is called. Return an estimate of $v_a$:

$$v_a^{est} = median_{i \in [H]} \{v_a^{h_i}\}$$

where $$v_a^{h_i} = \frac{T[i][h_i(a)] - sum(S)/K}{1 - 1/K}$$

As shown in the proofs at the end of this discussion, each $v_a^{h_i} (i \in [H])$ is an unbiased estimator of $v_a$ with variance inversely proportional to (K−1). $v_a^{est}$ further improves accuracy by avoiding the extreme estimates.

3. ESTIMATEF2(S): Return an estimate of the second moment:

$$F_2^{est} = median_{i \in [H]} \{v_a^{h_i}\}$$

where $$F_2^{h_i} = \frac{K}{K-1} \sum_{j \in [K]} (Ts[i][j])^2 - \frac{1}{K-1} (sum(S))^2$$

As shown in the proofs at the end of this discussion, each $F_2^{h_i}$ forms an unbiased estimator of $F_2$ with variance inversely proportional to (K−1). $F_2^{est}$ further improves accuracy by avoiding the extreme estimates.

4. COMBINE($c_1, S_1, \ldots c_{\cal E}, S_{\cal E}$): The linearity of the sketch data structure allows us to linearly combine multiple sketches $$S = \sum_{k=1}^{l} c_k \cdot S_k$$

by combining every entry in the table:

$$Ts[i][j] = \sum_{k=1}^{l} c_k \cdot Ts_k[i][j]$$

The forecasting module uses the observed sketches in the past intervals $S_o(t_0)$ ($t_0 < t$) to compute the forecast sketch $S_f(t)$ and along with it the error between the observed and forecast sketches as $S_e(t)$. At least six known models may be used in univariate time series forecasting and change detection for these purposes. The first four models are simple smoothing models, while the other two belong to the family of ARIMA models. All six models can be implemented on top of sketches by exploiting the linearity property of sketches.

The first four such useful forecasting models are simple smoothing models and are popular due to their simplicity. They are: moving average (MA), exponentially weighted moving average (EWMA), S-shaped moving average (SMA), and non-seasonal Holt-Winters (NSHW).

The Moving Average (MA) forecasting model assigns equal weights to all past samples, and has a single integer parameter $W \geq 1$ which specifies the number of past time intervals used for computing the forecast for time t.

$$S_f(t) = \frac{\sum_{i=1}^{W} S_j(t-i)}{W}, W \geq 1$$

The S-shaped Moving Average (SMA) forecasting model is a class of weighted moving average models that give higher weights to more recent samples.

$$S_f(t) = \frac{\sum_{i=1}^{W} w_i \cdot S_j(t-i)}{\sum_{i=1}^{W} w_i}, W \geq 1$$

A subclass is used that gives equal weights to the most recent half of the window and linearly decayed weights for the earlier half.

In the Exponentially Weighted Moving Average (EWMA) forecasting model, the forecast for time t is the weighted average of the previous forecast and the newly observed sample at time t−1.

$$S_f(t) = \begin{cases} \alpha \cdot S_o(t-1) + (1-\alpha) \cdot S_f(t-1), & t > 2 \\ S_o(1), & t = 2 \end{cases}$$

The parameter α∈[0,1] is called the smoothing constant. It indicates how much weight is given to new samples vs. historic data from previous intervals.

The Non-Seasonal Holt-Winters (NSHW) forecasting model is another commonly used smoothing model that may be applied to detect aberrant behavior. In the Non-Seasonal Holt-Winters model, there is a separate smoothing component $S_s(t)$ and a trend component $S_t(t)$. There are two parameters α∈[0,1] and β∈[0,1].

$$S_s(t) = \begin{array}{l} \alpha \cdot S_o(t-1) + (1-\alpha) \cdot S_t(t-1), \quad t > 2 \\ S_o(1), \quad t = 2 \end{array}$$

$$S_t(t) = \begin{array}{l} \beta \cdot (S_s(t) - S_s(t-1)) + (1-\beta) \cdot S_t(t-1), \quad t > 2 \\ S_o(2) - S_o(1), \quad t = 2 \end{array}$$

The forecast is then $S_f(t) = S_s(t) + S_t(t)$.

Box-Jenkins methodology, or the AutoRegressive Integrated Moving Average (ARIMA) modeling technique, is a class of linear time series forecasting techniques that capture the linear dependency of the future values on the past values. They are able to model a wide spectrum of time series behavior. As a result, they have been extensively studied and widely used for univariate time series forecasting and change detection.

An ARIMA model includes three types of parameters: the autoregressive parameter (p), the number of differencing passes (d), and the moving average parameter (q). In the notation introduced by Box and Jenkins, models are summarized as ARIMA (p, d, q). A model described as (0, 1, 2) means that it contains p=0 (zero) autoregressive parameters and q=2 moving average parameters which were computed for the time series after it was differenced once (d=1). In the discussions herein, only integral values for p, d, and q are used. Although there has been recent work on models with a fractional d parameter (such as the AutoRegressive Fractional Integrated Moving Average (ARFIMA) model) in the context of action-reaction models, though their application in the networking context has not been fully explored.

A general ARIMA model of order (p, d, q) can be expressed as:

$$Z_t = \sum_{i=1}^{q} MA_i \cdot Z_{t-i} = C + e_t - \sum_{j=1}^{p} AR_j \cdot e_{t-i}$$

where $Z_t$ is obtained by differencing the original time series d times, $e_t$ is the forecast error at time t, $MA_i$ (i=1, . . . , q) and $AR_j$ (j=1, . . . , p) are MA and AR coefficients. In practice, p and q very rarely need to be greater than 2. The number of differences (d) is typically either 0 or 1. Therefore, when we extend ARIMA models are applied to the sketch context, only the following two types of ARIMA models (the names are based on the number of differences) will be discussed in detail:

ARIMA0: ARIMA models of order (p≦2, d=0, q≦2)

ARIMA1: ARIMA models of order (p≦2, d=1, q≦2)

In ARIMA models, the choice of MA and AR coefficients ($MA_i$(i=1, . . . , q) and $AR_j$ (j=1, . . . , p)) must ensure that the resulting models are invertible and stationary. As a necessary but insufficient condition, $MA_i$ and $AR_j$ must belong to the range [−2, 2] when p, q≦2.

After constructing the forecast error sketch $S_e(t)$, the change detection module chooses an alarm threshold TA based on the estimated second moment of $S_e(t)$:

$$T_A \stackrel{def}{=} T \cdot [ESTIMATEF2(S_e(t))]^{\frac{1}{2}}$$

where T is a parameter to be determined by the application.

Now for any key a, the change detection module can reconstruct its forecast error in $S_e(t)$ using ESTIMATE ($S_e(t)$, a) and raise an alarm whenever the estimated forecast error is above the alarm threshold TA.

The remaining question is how to obtain the stream of keys for the change detection module. Sketches only support reconstruction of the forecast error associated with a given key. It does not contain information about what keys have appeared in the input stream.

There are several possible solutions to this problem. With the brute-force solution, one can record all the keys that appeared in recent intervals (e.g., the same interval t over which $S_e(t)$ is defined) and replay them after $S_e(t)$ has been constructed. This still requires maintaining per-flow information. Its scalability is limited by the maximum number of keys that appear in the window for key collection. One can avoid keeping per-flow state by using a two-pass algorithm—construct $S_e(t)$ in the first pass and detect changes on the second pass. Since the input stream itself will provide the keys, there is no need for keeping per-flow state. This requires access to the same input stream twice and thus useful only in the offline context. A third alternative is to use the keys that appear after $S_e(t)$ has been constructed. This works in both online and offline context.

The risk is that those keys that do not appear again after they experience significant change will be missed. This is often acceptable for many applications like DoS attack detection, where the damage can be very limited if a key never appears again. Note that this does not need to be done for every newly arrived data item. If the risk of missing some very infrequent keys is acceptable, one can sample the (future) input streams and only work on a sub-stream of keys.

Another possibility is to incorporate combinatorial group testing into sketches. This allows one to directly infer keys from the (modified) sketch data structure without requiring a separate stream of keys. However, this scheme also increases the update and estimation costs and additional research is required to make it more efficient. In the remaining descriptions, the offline two-pass algorithm is assumed in all experiments.

The change detection framework includes sketch-related parameters as well as control parameters for various forecasting models. Guidelines and heuristics for properly configuring these parameters will now be described.

H and K are two sketch-related parameters: the number of hash functions (H), and the size of hash tables (K). Depending on the choice of H and K, k-ary sketches can provide probabilistic guarantees on the estimation accuracy of the forecast errors and their total energy (see the proofs at the end of this discussion for details). Such analytical results may be used to determine the choice of H and K that are sufficient to achieve targeted accuracy. As the analytical results apply in a data-independent way, the resulting H and K may be too conservative for the actual dataset. Hence, analytical results may further be used to derive data-independent choice of H and K and treat them as upper bounds. Actual data may then be employed to find the best (data-dependent) H and K values in an actual application.

In the context of univariate time series forecasting, a commonly used simple heuristic for configuring model parameters is choosing parameters that minimize the total residual energy, i.e., the sum of squares of forecast errors over time. The above heuristic can be extended to the sketch context in order to look for parameters that minimize the total energy in the resulting forecast error sketches over time $\Sigma_t F_2(S_e(t))$, where $F_2(S_e(t))$ is the second moment for all the forecast errors summarized by sketch $S_e(t)$.

The true $F_2(S_e(t))$ can not be known unless per-flow analysis is performed for each parameter setting, which can be prohibitive. Instead, one can use the estimated second moment $F^{est}_2(S_e(t))$, as long as $F^{est}_2(S_e(t))$ closely approximates $F_2(S_e(t))$. In other words, one must find parameters that minimize the estimated total energy of forecast errors $\Sigma_t F_2^{est}(S_e(t))$.

For parameters that are continuous, a multi-pass grid search algorithm may be employed to find a good choice. Consider for example the EWMA model. The first pass finds a parameter $\alpha \in \{0.1, 0.2, \ldots, 1.0\}$ that minimizes the estimated total energy for the forecast errors. Let $a_0$ be the best K. The second pass equally subdivides range $[a_0-0.1; a_0+0.1]$ into N=10 parts and repeats the process. High precision is obtained via multiple passes. For models with integral parameters, such as the moving average model, the parameter may simply be varied to find the best values. Note that grid search is only a heuristic. It does not guarantee that the optimal parameter combination that minimizes the estimated total energy for forecast errors will be found. However, grid search has been found to yield accurate parameters such that the resulting model captures the overall time series behavior.

Large amounts of real Internet traffic data were used to evaluate and validate this approach. A discussion of datasets and the experimental parameter settings used will now be presented in detail.

Input data flows were chosen to be four hours worth of netflow dumps from ten different routers in the backbone of a tier-1 ISP. Nearly 190 million records are processed with the smallest router having 861,000 records and the busiest one having over 60 million records in a contiguous four-hour stretch.

Various values of parameters were used in these experiments to determine acceptable ranges of choices. These values may be tailored in the sketch-based approach based on actual local data available. Accordingly, some of the parameters may have different values when the sketch technique is used in different applications.

The cost of estimation and updating is dominated by the number of hash tables used for sketches, so small values for H should be chosen. Meanwhile, H improves accuracy by making the probability of hitting extreme estimates exponentially small (see Theorems 2, 3, and 5 appearing at the end of this discussion for more details), suggesting again that it is enough to use a small value for H. H was varied to determine the impact on the accuracy of estimation with respect to the cost. Selections of H (1, 5, 9, and 25) were driven by the fact that optimized median networks can be used to find the medians quickly without making any assumptions about the nature of the input.

The analytic upper bound needed to provide a specific degree of error threshold by using k-ary sketches was selected as the upper reach of K. One can tighten the lower bound of zero by empirically examining values between 0 and the upper bound in log(upper-bound) steps. Experimental results indicated an upper bound of K=64,000 and a lower bound of K=1024.

Another important parameter is the interval size: a long interval would result in delays since the sketch-based process 200 reports anomalies at the end of each interval and events that occur within a single interval only may be missed. A short interval requires updating the sketch-based forecasting data structures more frequently. Five minutes (300 seconds (s)) was selected as a reasonable tradeoff between the responsiveness and the computational overhead. Such an interval is used in other SNMP based network anomaly detection systems. We also use one minute (60 s) intervals to examine the impact of shorter intervals.

Each of the six time series forecasting models requires different choices of parameters. For the moving average models (MA and SMA), a single time interval was used for the minimum window size and ten (or twelve) to be the maximum window size for an interval size of five (or one) minutes. The window size yielding the minimum total energy of forecast errors across each of the interval values was then selected as the value for this parameter. For the remaining models, a two-pass grid search algorithm was applied to choose various parameters. For the EWMA and NSHW models, during each pass the current ranges were partitioned into ten equal intervals. For ARIMA models, however, the number of parameters is much larger and the search space becomes too large if each parameter range is partitioned into ten parts. To limit the search space then, the current search range was instead partitioned into seven parts. During grid search, H was fixed at 1 and K at 8000. As will later be demonstrated, with H=1 and K=8000 the estimated total energy of forecast errors closely approximates the true energy obtained using per-flow analysis.

The results of the evaluation of sketches for change detection will now be presented. The setup for the various experiments is described results are presented in detail for three models (EWMA and ARIMA with d=0 and 1), with occasional results for NSHW. In most cases, the results from the various models are largely similar and are excluded in the interest of brevity.

The evaluation is divided into three parts: First, the validity of the parameters generated by the grid search is reported. Next, an evaluation of sketches is provided at the flow-level—focusing on what sketch reports as (i) the top-N flows with the maximum absolute forecast errors, and (ii) the flows whose absolute forecast error exceeds a threshold, as well as a comparison of the sketch report with per-flow schemes.

The experiments now described were concerned with determining appropriate parameter settings for the forecast models, values for H and K, and in evaluating the usefulness of grid search functions. The estimated total energy (instead of the true total energy) was used as the metric for selection of the forecast model parameter setting. For this approach to yield good performance, the estimated value must closely track the true value. This was the focus of these experiments. The space of (H, K) values and various parameter settings were examined to select suitable choices of H and K that resulted in acceptable performance. Grid search functions were used to select the parameter setting that results in the minimum total energy. The "goodness" of the parameter selected by grid search was then compared to a random selection of parameters.

Figure 3:
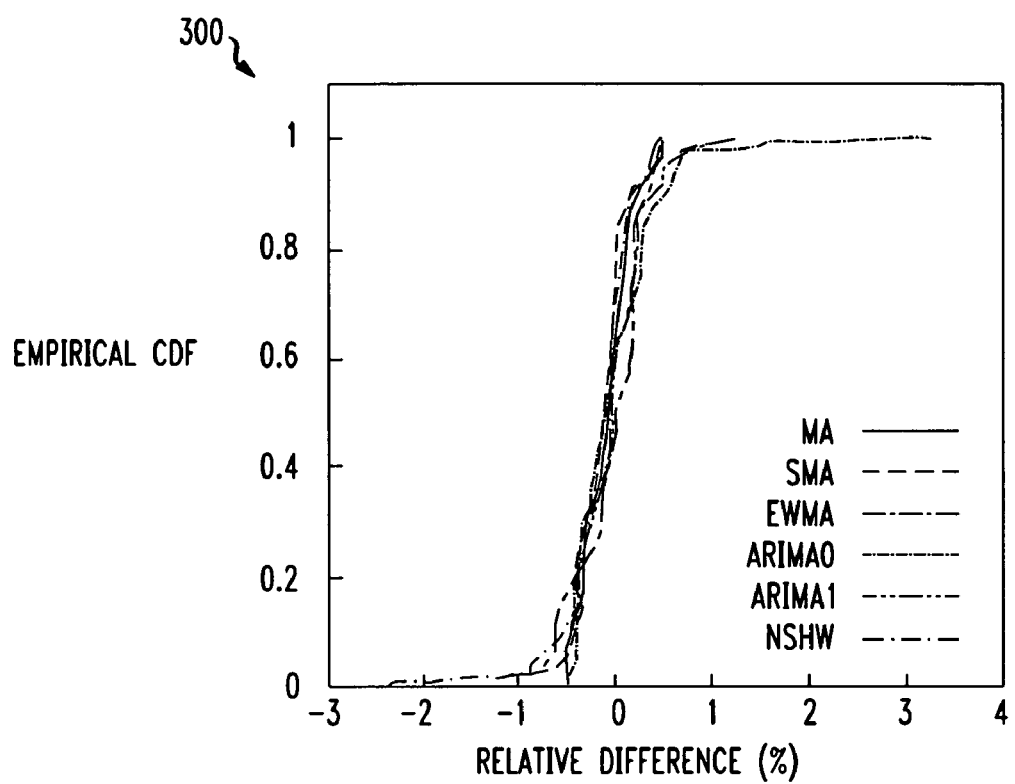
FIG. 3 depicts a graph of the cumulative distribution function (CDF) of Relative Difference between sketch-based processes used in the process of FIG. 2 and per-flow analysis.

In FIG. 3, the Cumulative Distribution Function (CDF) for Relative Differenceis shown across all models with interval=300 seconds, H=1, and K=1024. A set of experiments (called random) were performed over a collection of 10 router files (consisting of over 189 million flow records). For each forecast model, a number of points were randomly selected in the model parameter space, and for each chosen point and (H, K) value combination, both sketch and per-flow based detection were run on each router trace. The goal here was to examine differences between the different forecast models, and to evaluate parameter value choices for H and K (the hash table and range sizes). This experiment also allowed examination of how sketches and per-flow compare when forecast parameters are not selected carefully. The comparison metric is the "Relative Difference," which is defined as the difference between the total energy (square root of the sum of second moments for each time interval) computed from the sketch-based technique and the total energy obtained using per-flow detection, expressed as a percentage of the total energy obtained using per-flow detection. For a particular forecast model and (H, K) combination, for each router file, we obtain multiple Relative Difference values, one for each selected point in the parameter space for that model.

Figure 4A:
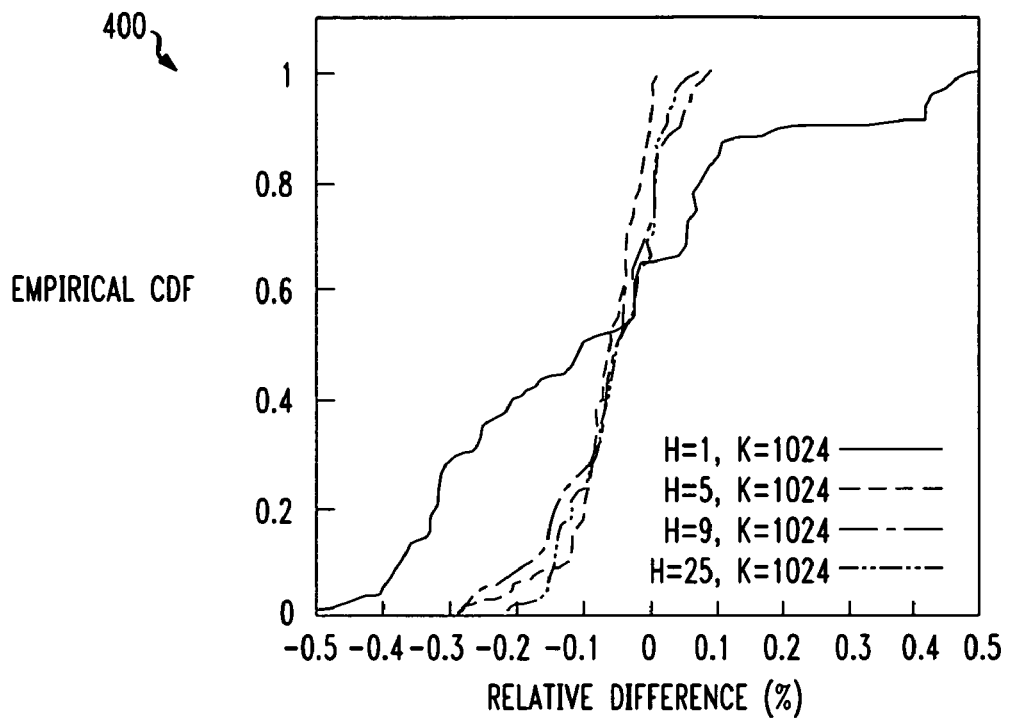
FIG. 4 depicts graphs of the results of random selection of h parameters for time series forecasting models used with the process of FIG. 2.
Figure 4B:
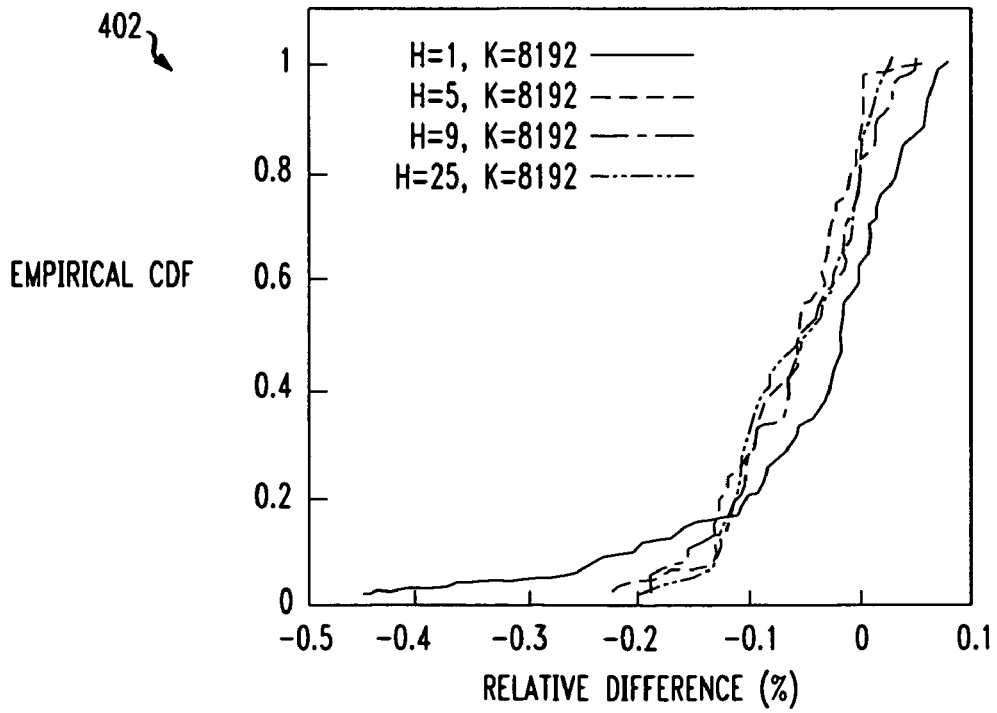
Figure 5A:
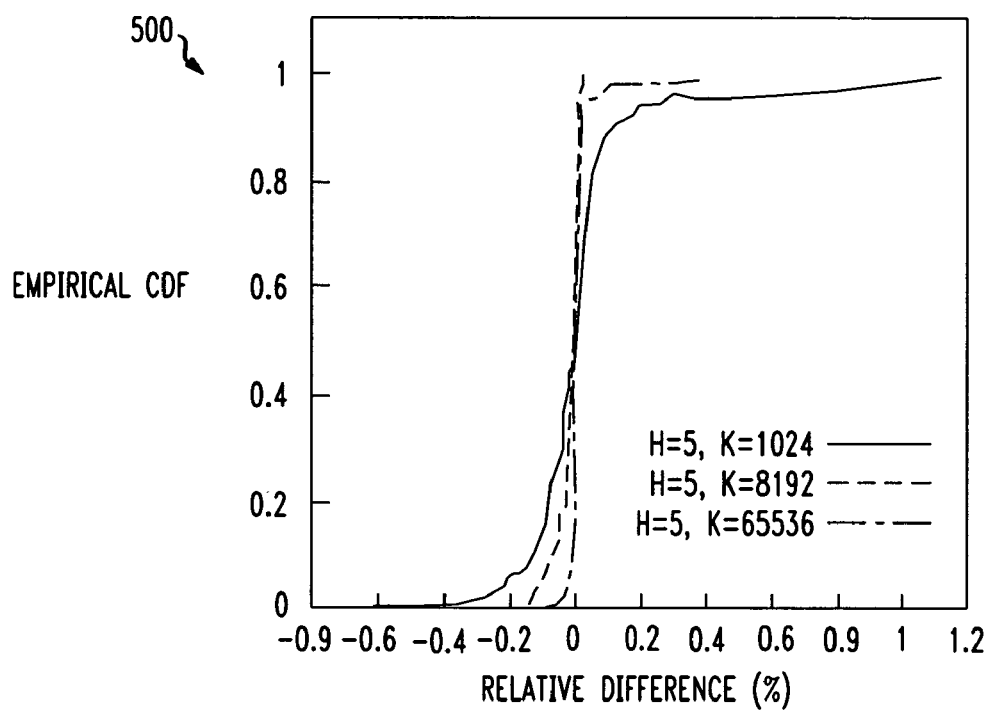
FIG. 5 depicts graphs of the results of random selection of K parameters for time series forecasting models used with the process of FIG. 2.
Figure 5B:
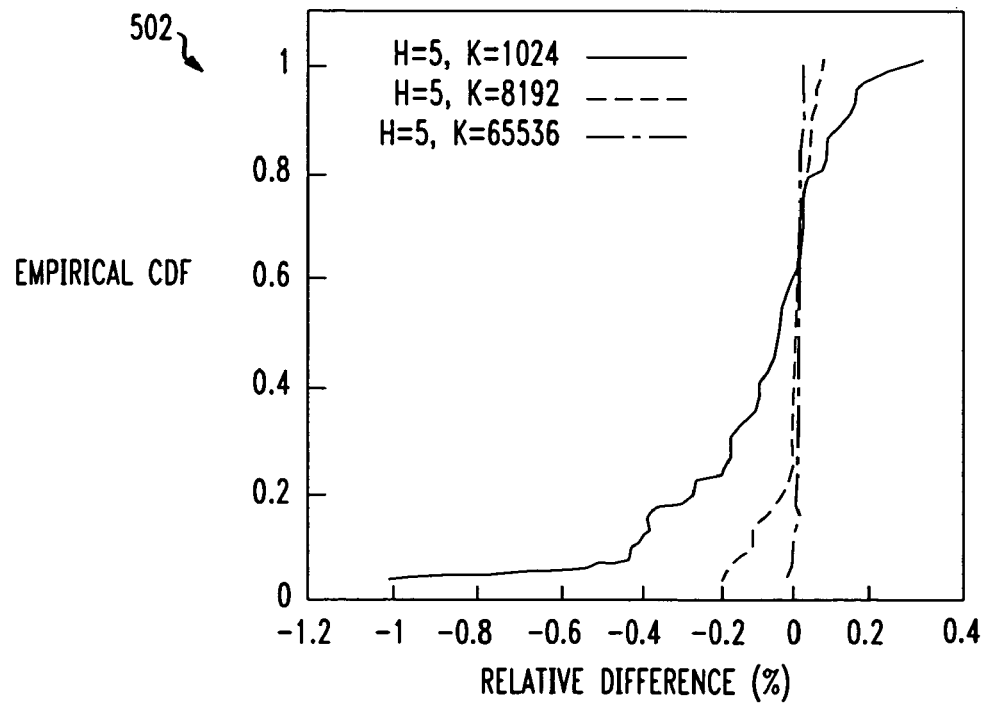

In FIGS. 3-5, each curve corresponds to a particular forecast model and (H, K) combination, and represents the empirical CDF of the Relative Difference values aggregated from across all the routers. FIG. 3 shows that even for small H (1) and K (1024), across all the models, most of the mass is concentrated in the neighborhood of the 0% point on the x-axis, indicating that even for randomly chosen model parameters, the total energy from the sketch-based approach is very close to that for per-flow. Only for the NSHW model a small percentage of points have sketch values that differ by more than 1.5% from the corresponding per-flow values. The worst case difference is 3.5%.

Next, the impact of varying the H parameter is examined. FIG. 4 shows, in the graph 400 of the EWMA model and the graph 402 of the ARIMA0 models, that there is no need to increase H beyond 5 to achieve low relative difference.

The last set of results for the random parameter technique is shown in FIG. 5, and demonstrates that once K=8192 the relative difference becomes insignificant, obviating the need to increase K further. The grid search technique for identifying parameters uses six models for both 60 s and 300 s intervals (shown in graphs 500 and 502, respectively), a representative sample of router files (one large, one medium, and one small sized file), and (H=1, K=8192) combination. For each (model, router, H, K) combination, grid search outputs the parameter value(s) for that model that minimize the total energy in the resulting forecast errors. Using this parameter setting output by grid search, per-flow analysis was run to obtain the corresponding total energy. The per-flow estimate was then compared against the per-flow estimates of the random parameters generated in the previous technique, for the same router file and model. The goal of this experiment was twofold: first, to ensure that grid search results are never worse than any of the per-flow values of the random parameters; second, to show that grid search results can be significantly better than the results in the random case. The experimental results show that in all cases (all models, three router files, both intervals) grid search is never worse than the random parameters. Secondly, in at least 20% of the cases the results with the random parameters are at least twice (and in many cases much more) as bad as the errors in the grid search case. This justifies the use of grid search to generate the parameters for the remainder of the experiments.

After validating the set of parameters from the grid search scheme, the sketch scheme's accuracy is compared to per-flow estimates via two techniques: (i) Top-N, and (ii) Thresholding.

The values of H and K are key to the accuracy of the forecasts as well as efficient operation. Care must be taken to choose the proper range of values on a per-application basis. Experimental results based on large and diverse data sets show that the values chosen (H=1 . . . 25), (K=1,000 . . . 64,000) are indeed suitable for the change detection class of applications.

Top-N sketch vs. perflow evaluation was conducted for a given N, to determine how many of the top-N flows (ranked in order of decreasing magnitude of forecasting errors) detected by the per-flow scheme are also detected as to p-ranking by the sketch-based scheme. Three values of H (5, 9, 25) and K (8000, 32000, 64000), two values of intervals (60 s and 300 s), and three router data files representing high volume (over 60 Million), medium (12.7 Million), and low (5.3 Million) records, were selected to carry out sketch accuracy evaluation across all models. For the model parameters, the parameter values selected by the grid search process were used. For each time interval, the top-N flows with the maximum absolute forecast errors (recall that a higher absolute forecast error indicates that a flow's volume has a higher deviation from that predicted by the underlying model) are generated for both sketches and per-flow techniques. For four values of N (50, 100, 500, 1000), we see how many of the top-N flows are in common between the two resulting sets and compute a similarity metric $N_{AB}/N$, where $N_{AB}$ is the number of common elements in the two sets.

While some of the top-N ranked elements from the per-flow technique may not belong to exactly the top-N elements output by the sketch technique, the hope is that these elements will still be high in the sketch-based ranking. Thus, it is possible to increase the accuracy by comparing the top-N per-flow list with additional elements in the sketch-based ranked list. To evaluate this possibility, a second set of comparisons involves comparing the top-N per-flow results against the top-X*N (X=1, 1.2, 1.5, 2) results from the sketch-based approach.

Results show how well sketches perform when compared with per-flow by comparing their top-N (N=50, 100, 500, 1000) flows. The metric is essentially a similarity one: the number of common elements in the two sets normalized by N. It has been demonstrated that this metric is remarkably consistent across the time intervals, for moderate H and K. The first hour of the four-hour data sets were used only for model warm-up purposes, leaving 180 and 37 intervals respectively in the 60 second and 300 second time interval cases.

Figure 6A:
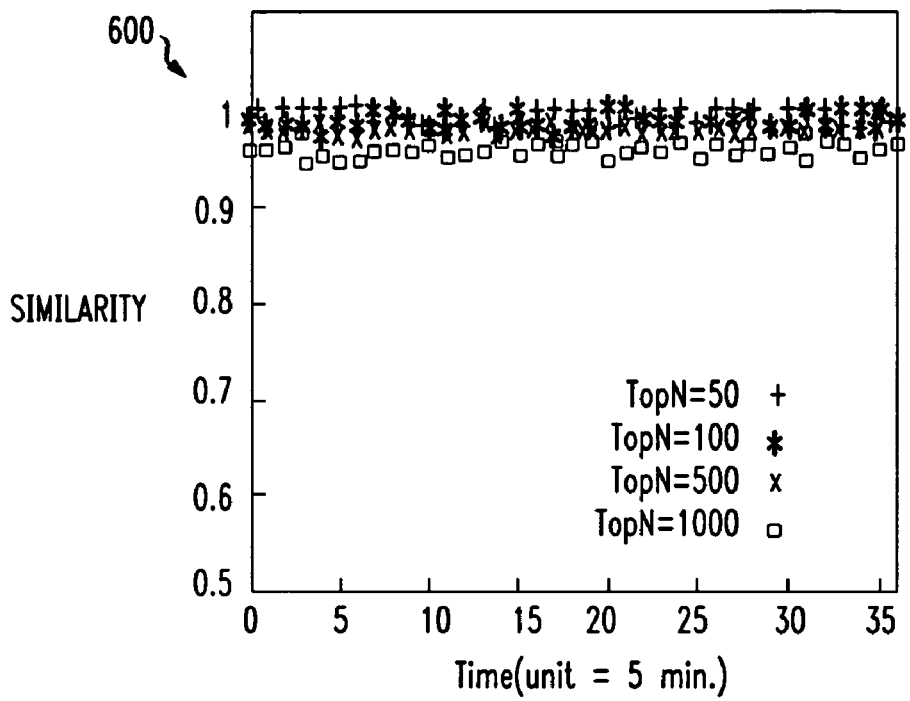
FIG. 6 depicts graphs of the overall similarity of per flow measurements and sketch functions used with the process of FIG. 2 for large router files with time series forecast parameters H=5 and K=32000.
Figure 6B:
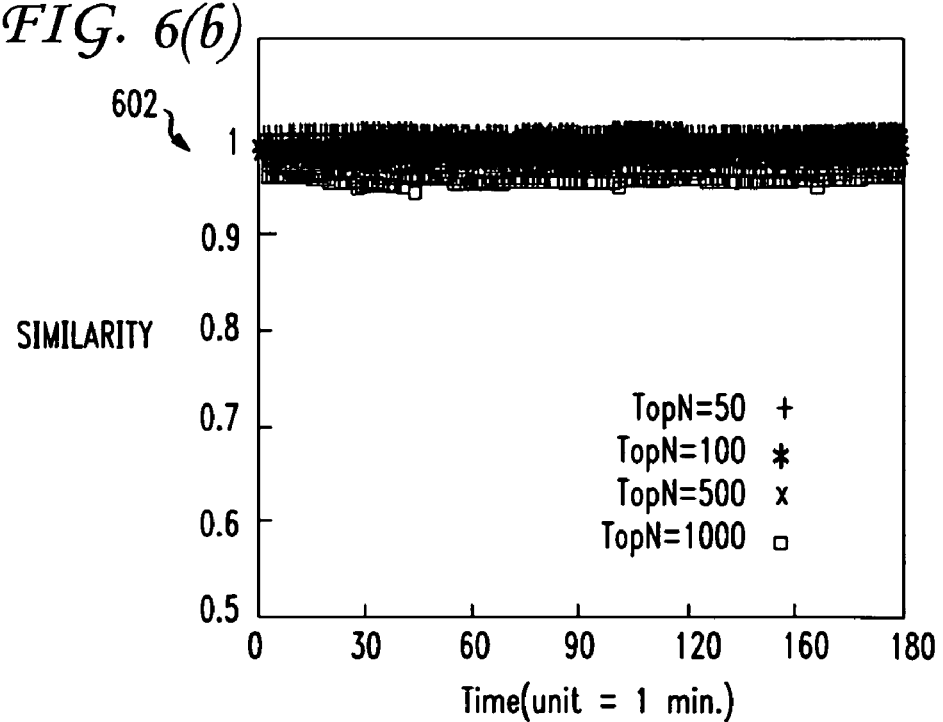

Graphs 600 and 602 of FIG. 6 show that even for large N (1000), the similarity is around 0.95 for both the 60 s and 300 s intervals, respectively, for H=5 and K=32K. In the remaining FIGS. 7-9, we show the mean similarity value across the 180 and 37 intervals.

Figure 7A:
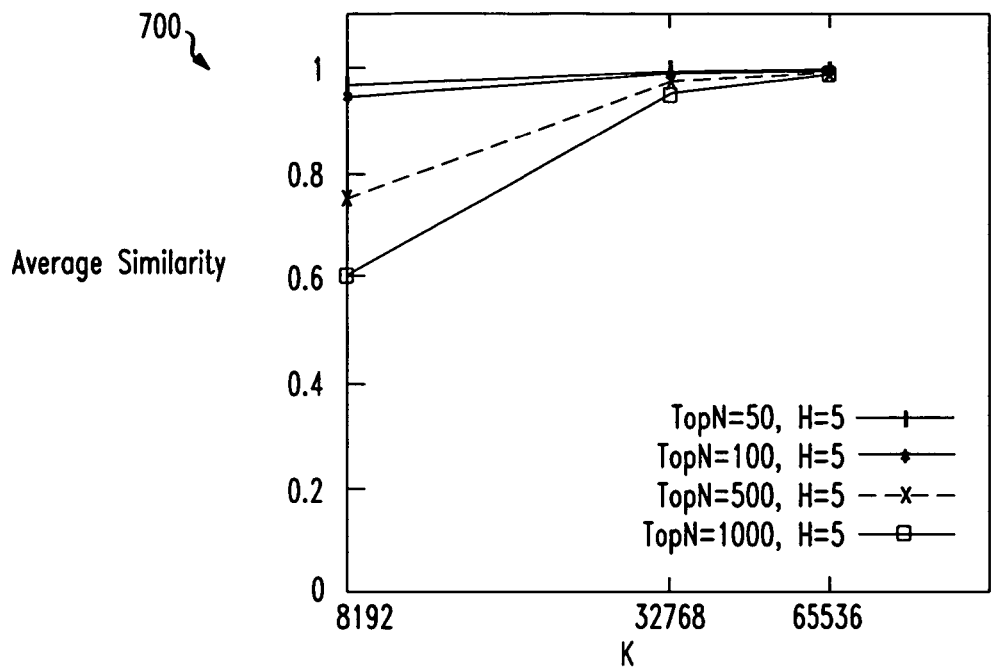
FIG. 7 depicts graphs of the average similarity in the EWMA model used with the process of FIG. 2 where H is fixed at 5 and K varies between 8K and 64K, for both 300 s and 60 s time intervals.
Figure 7B:
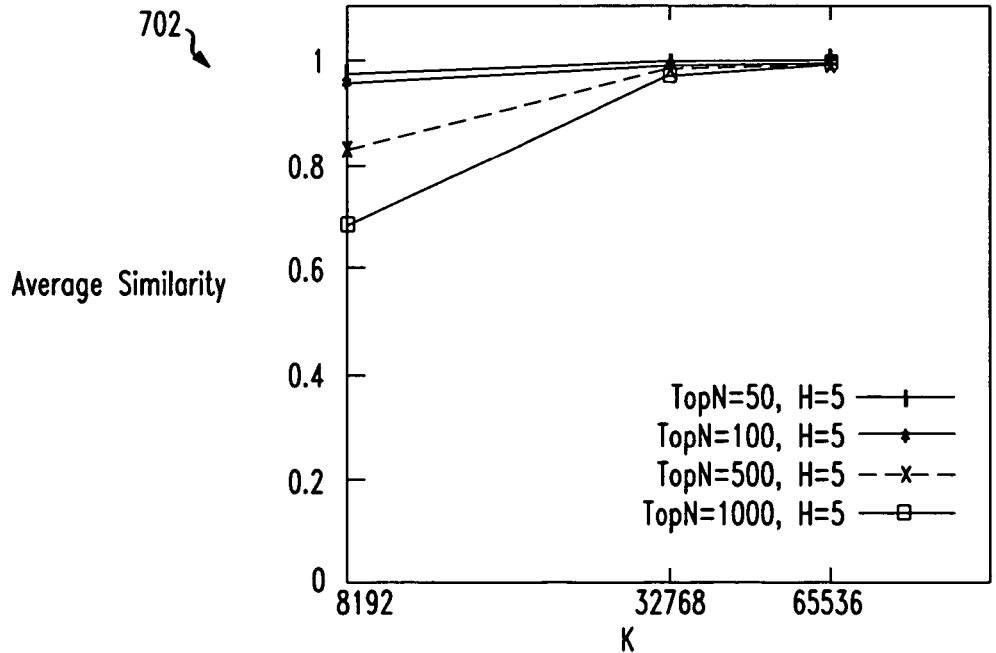
Figure 8A:
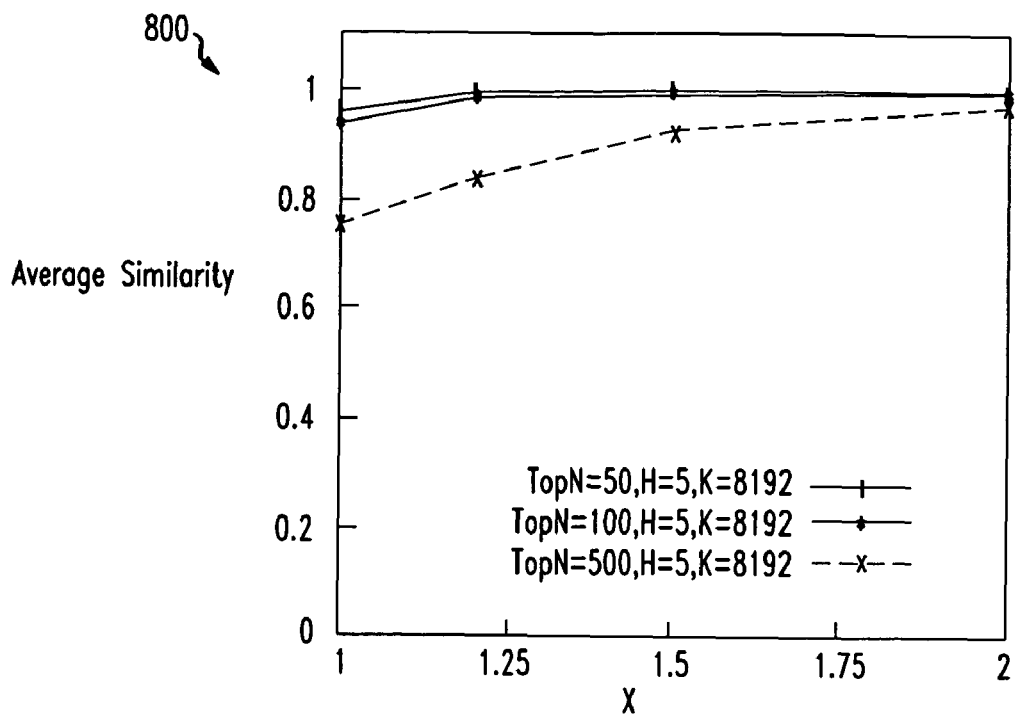
FIG. 8 depicts graphs of the accuracy of top N vs. top X*N for the EWMA model used with the process of FIG. 2 for large router files.
Figure 8B:
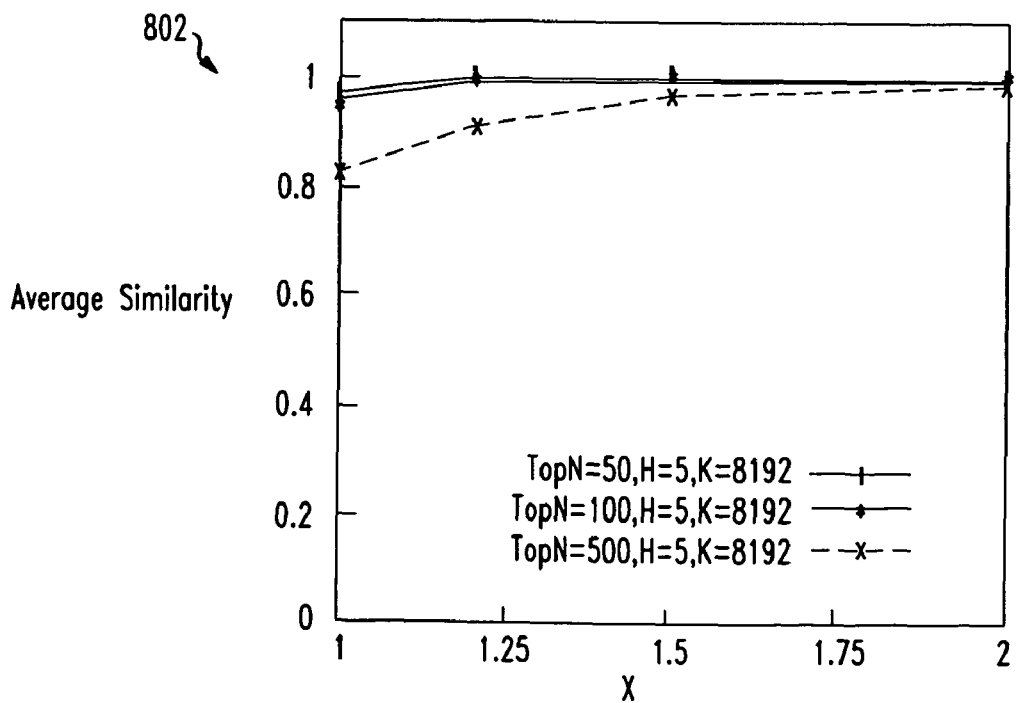

Graphs 700 and 702 of FIG. 7 use the EWMA model to show average similarity (across the time intervals), where H is fixed at 5 and K varies between 8K and 64K, for both 300 s and 60 s time intervals, respectively. As can be seen, for K=32000, the similarity is over 0.95 even for large N. For a smaller N (say 50 or 100), the overlap is nearly 100%. Larger values of K are of limited additional benefit. Note that similarity improves (for large N) with the smaller interval size of 60 seconds. This increased accuracy can be attributed to the fact that for a smaller interval, there are potentially fewer flows that have to be summarized in each interval.

The potential of improving accuracy is explored by performing a top-N vs. top-X*N (X=1, 1.2, 1.5, 2) comparison. As can be seen in graphs 800 and 802 of FIG. 8 for the 300 s and 60 s intervals respectively, the similarity increases for K=8000, even for large N. With X=1.5, the similarity has risen significantly even for large N. For the settings examined, a very high accuracy is achieved with X=1.5, and higher values of X result in only marginal additional accuracy gains. This is desirable because a larger X, while increasing accuracy, also results in more false positives.

Figure 9A:
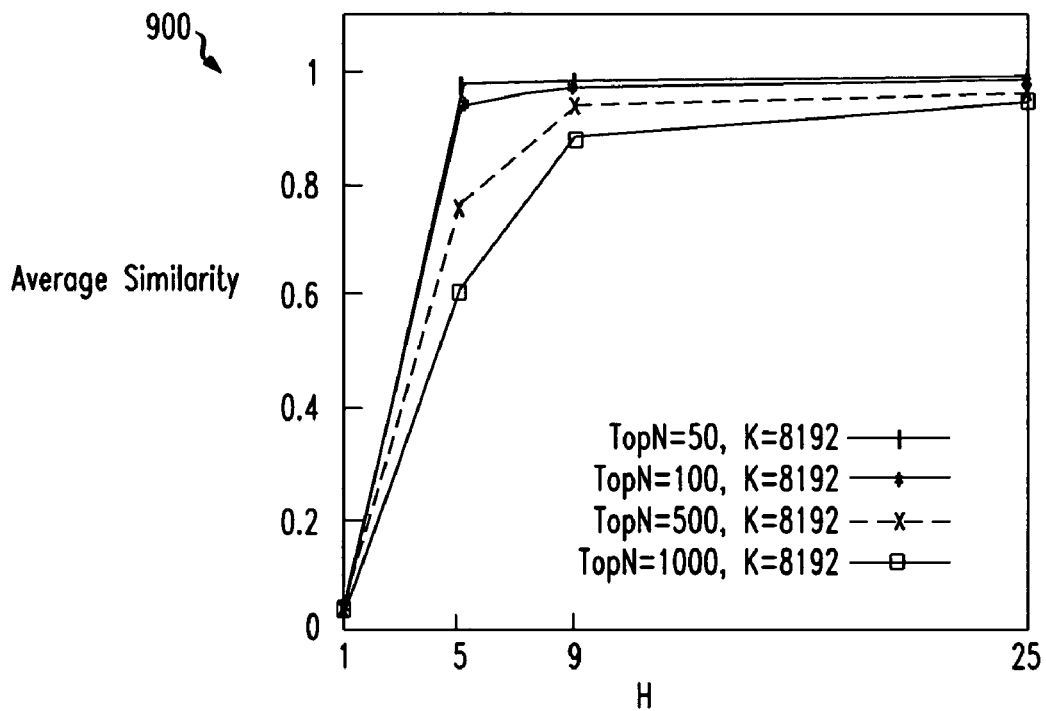
FIG. 9 depicts graphs of the effect of varying H and K parameters for EWMA models used with the process of FIG. 2 for large router files.
Figure 9B:
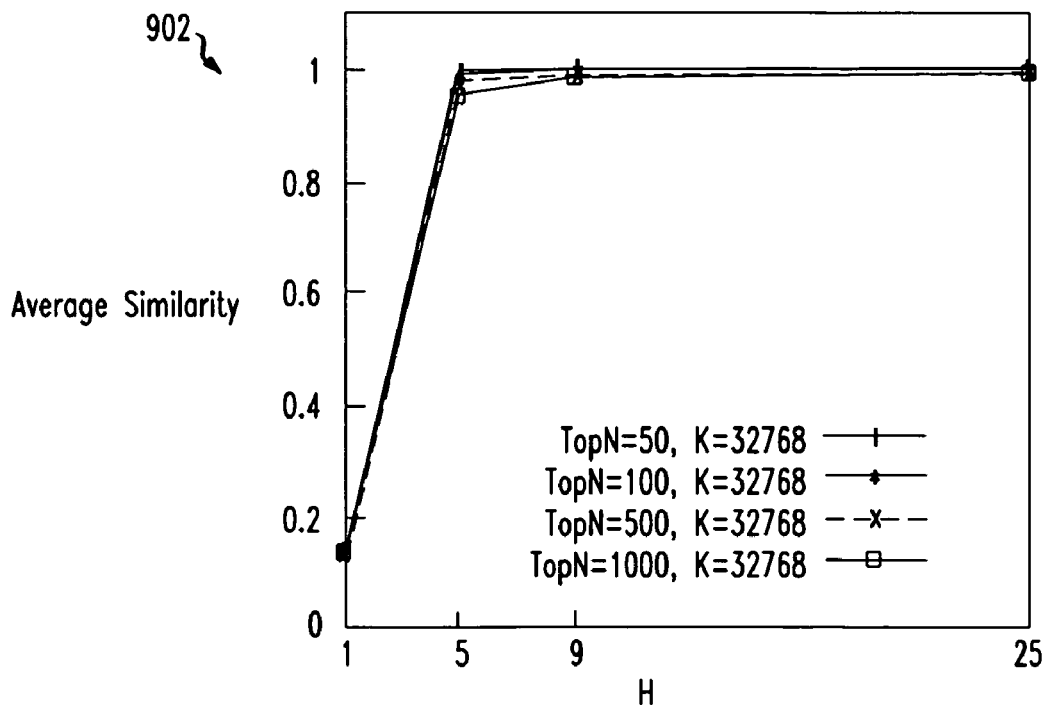

The effect of varying H on the accuracy is next considered. Graph 900 of FIG. 9 shows that with a small K=800, H needs to be at least 9 to get high similarity values, especially for large N. A large H is undesirable as an increase in H directly corresponds to increased computation overhead (the number of update operations per key is proportional to the value of H) and memory (for sketches) overhead.

However, as graph 902 of FIG. 9 shows, even for very large N, increasing K to 32000 instantly increases similarity to nearly 1, for a small H=5. A larger K (for sketches) implies a large space overhead. This suggests a space-computation overhead tradeoff. In many applications where the computation overhead is more critical, with K=32000 or more, one can obtain good accuracy results with a small value for H.

Figure 10A:
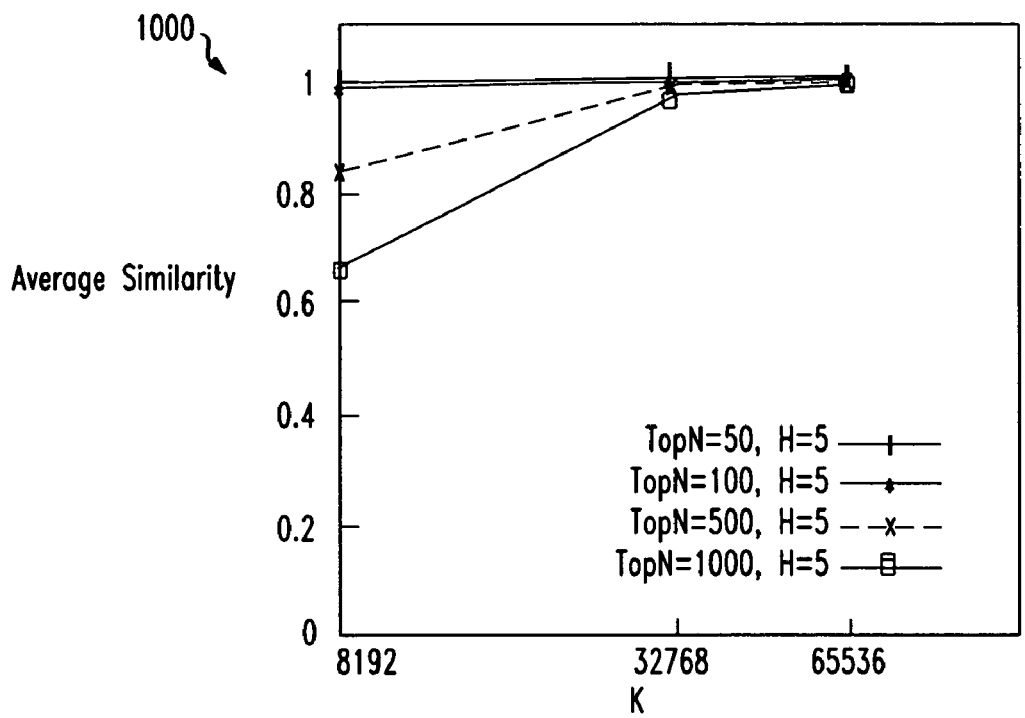
FIG. 10 is depicts graphs of similarity metrics for an EWMA model used with the process of FIG. 2 for large and medium sized router files at an interval of 300 s.
Figure 10B:
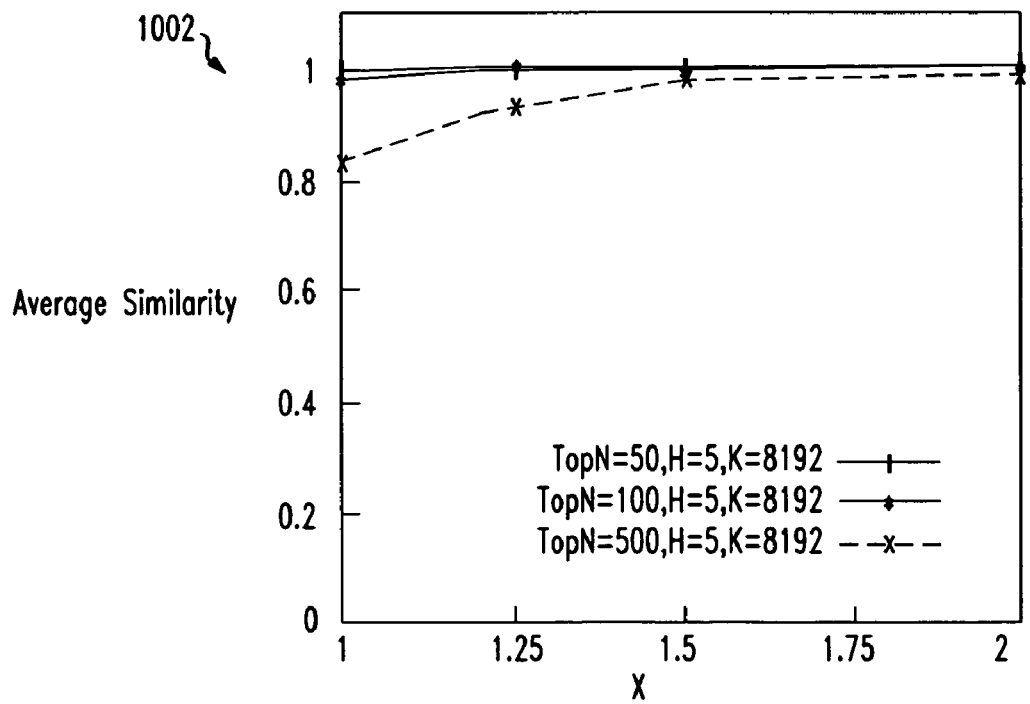

The results for a different router file, where all files have similar output, are displayed in graph 1000 (showing top-N v. top-N results) and graph 1002 (showing top-N v. top X*N results) of FIG. 10 as the similarity metric for the EWMA model for a medium sized router file.

Figure 11A:
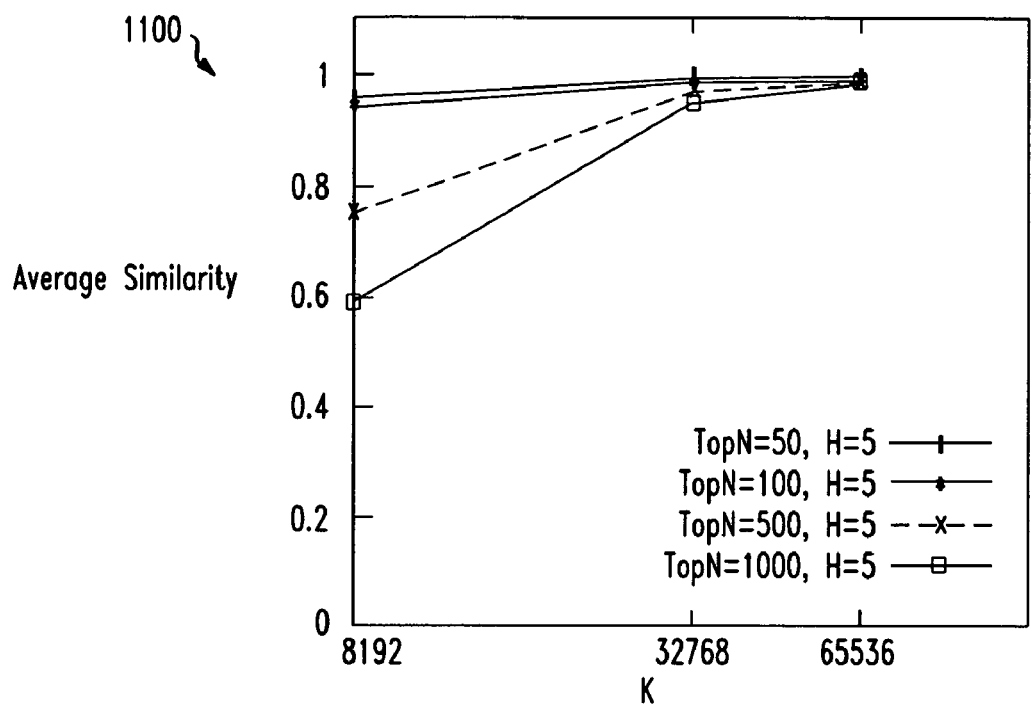
FIG. 11 depicts graphs of similarity metrics for an ARIMA model used with the process of FIG. 2 for large and medium sized router files at an interval of 300 s.
Figure 11B:
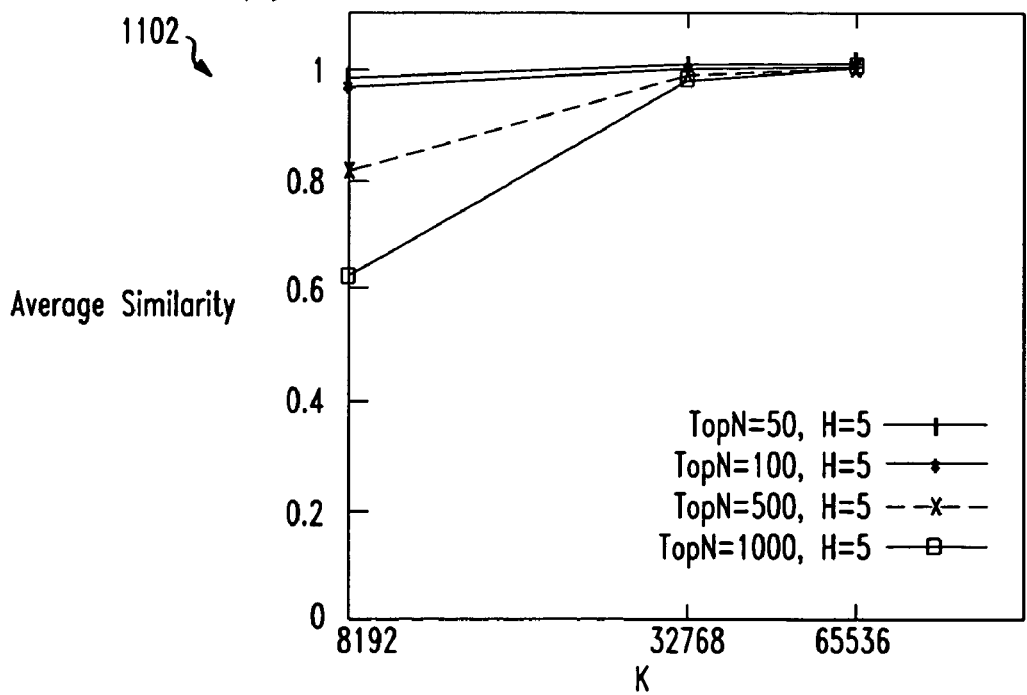

Likewise, we show the effect of an ARIMA0 model, i.e., ARIMA with d=0. Graphs 1100 and 1102 of FIG. 11 show similarity for large and medium sized router files, respectively, for an interval of 300 seconds.

Instead of comparing just the top-N values, as in the previous accuracy tests, the flows were limited to those whose absolute forecast error is greater than or equal to a certain fraction of the L2 norm (obtained by the square root of the sum of squares of the forecast errors of all flows in a time interval). This threshold level was varied across 0.01, 0.02, 0.05, 0.07, and 0.1. The results for each of the two time intervals (60 s, 300 s) were examined for three models (EWMA, NSHW, and ARIMA with d=0). For each of sketch and per-flow based change detection, the flows were ranked in decreasing order of absolute value of forecast error. The metrics of interest here are the false negative ratio, false positive ratio, and the number of alarms. For a given value of threshold O, let $N_{pf}(O)$ and $N_{sk}(O)$ refer to the number of flows that meet the threshold in per-flow and sketch based detection, respectively. The number of alarms for per-flow and sketches are then $N_{pf}(O)$ and $N_{sk}(O)$ respectively. Let $N_{AB}(O)$ be the count of flows that are common to both the sketch and per-flow lists. The false negative ratio is computed as:

$$\frac{N_{pf}(\tau) - N_{AB}(\tau)}{N_{pf}(\tau)},$$

The false positive ratio is:

$$\frac{N_{sk}(\tau) - N_{AB}(\tau)}{N_{sk}(\tau)}$$

At this point, for each metric there is a time series, with one value per time interval. The mean value over the entire time series were then considered.

Figure 12A:
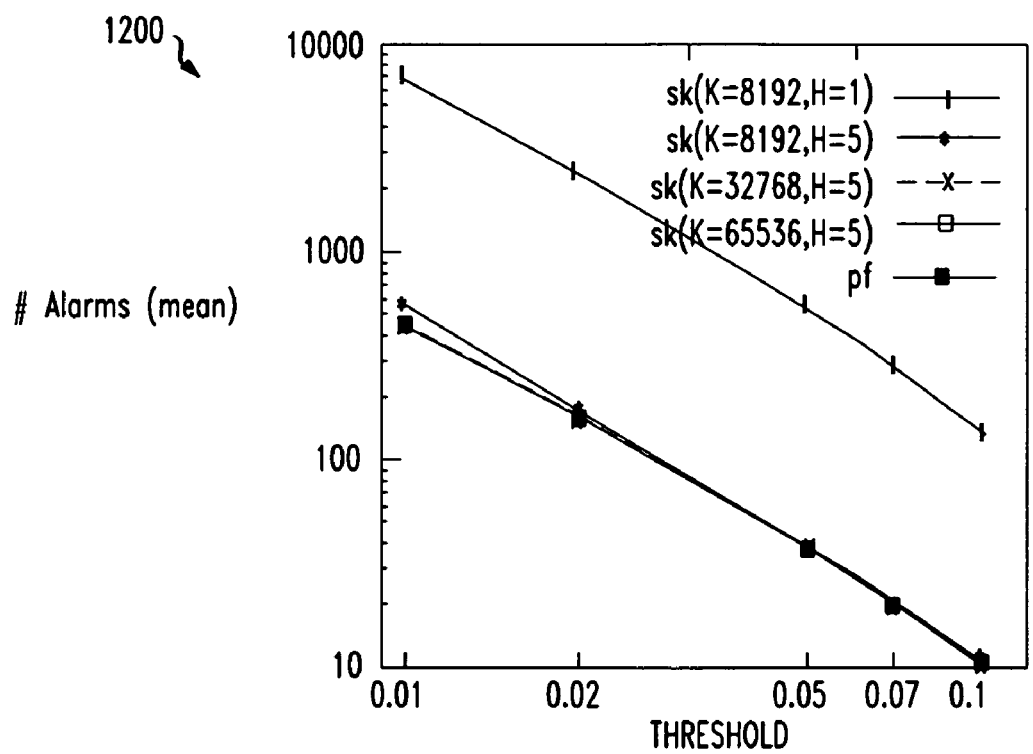
FIG. 12 is depicts graphs of number of alarms, number of false positives and number of false negatives at differing threshold values using the NSHW model with the process of FIG. 2 on a large router at a 60 second interval.
Figure 12B:
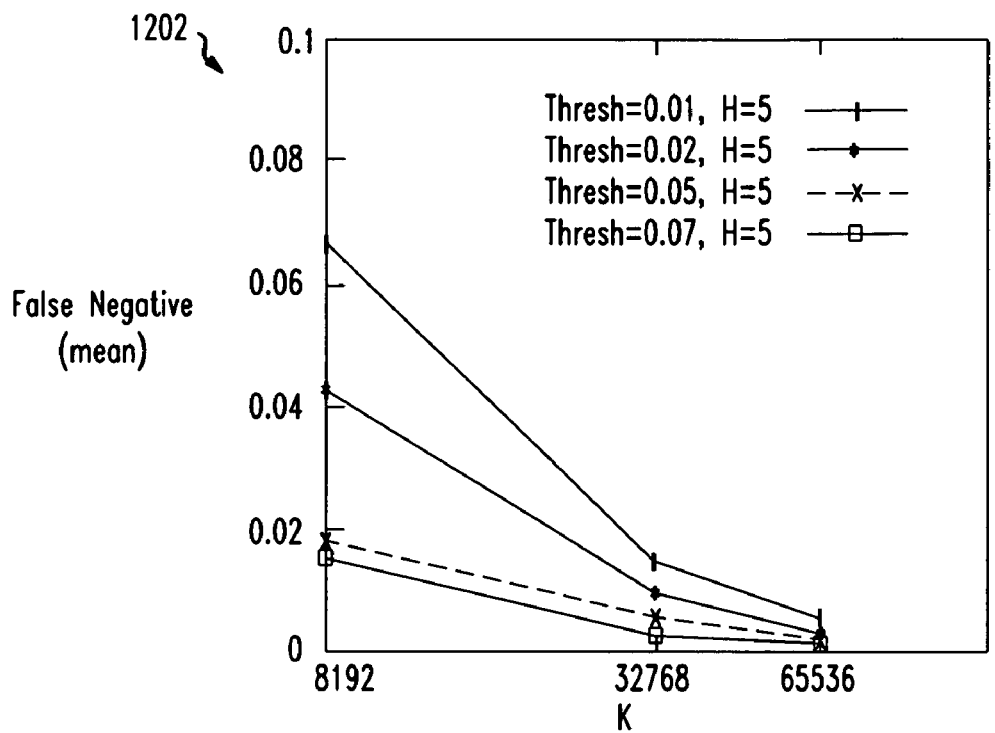
Figure 12C:
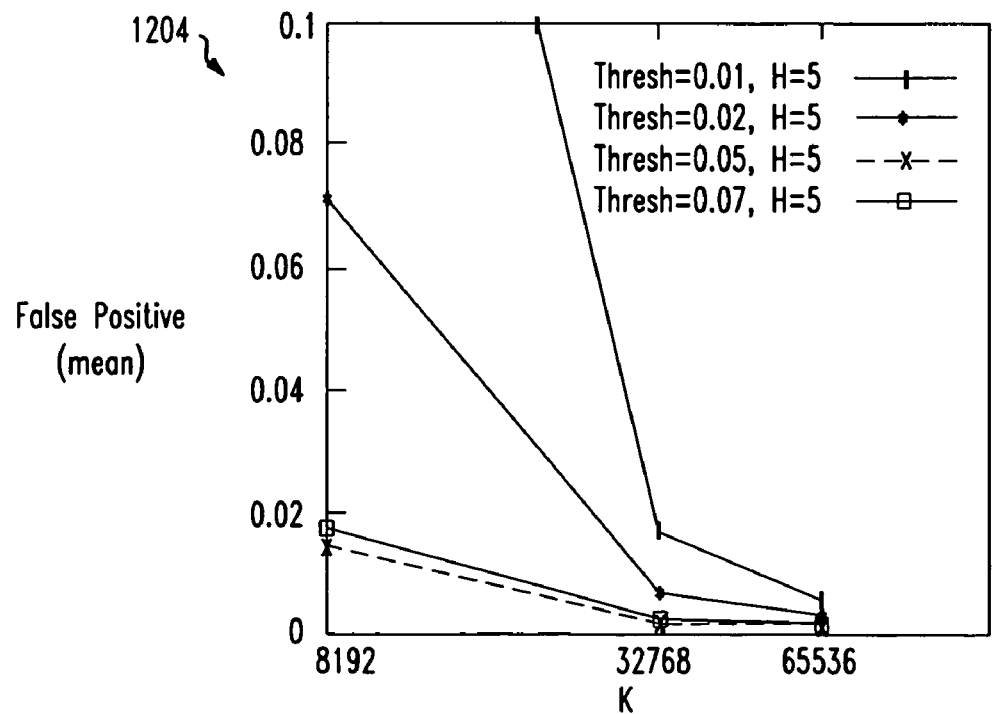
Figure 13A:
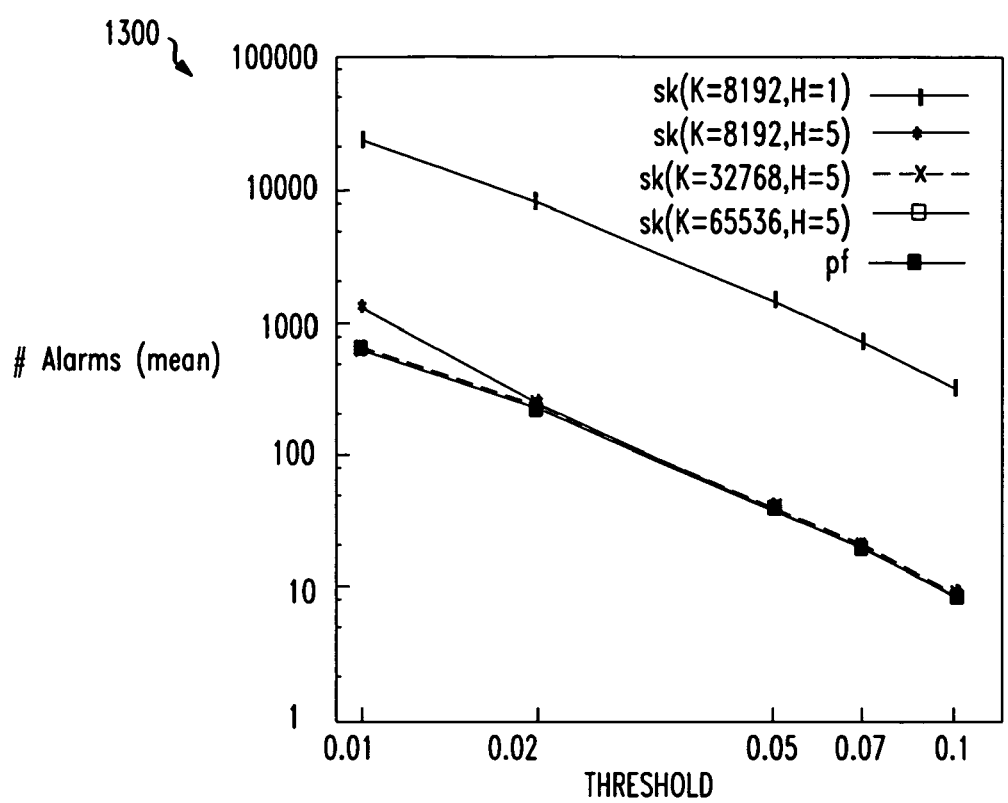
FIG. 13 depicts graphs of number of alarms, number of false positives and number of false negatives at differing threshold values using the NSHW model with the process of FIG. 2 on a large router at a 300 second interval.
Figure 13B:
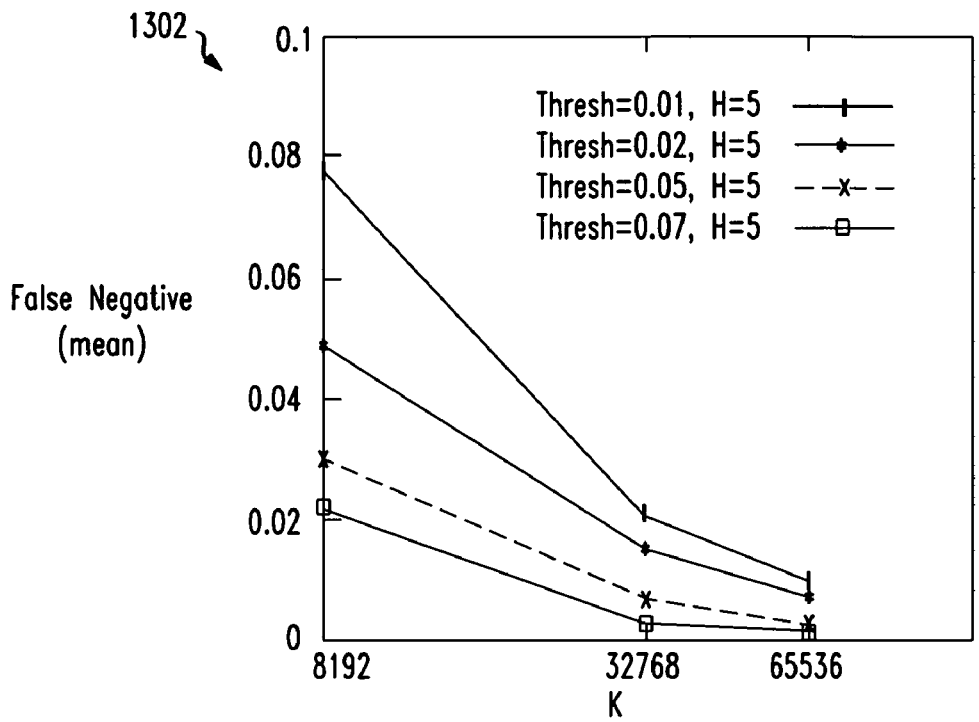
Figure 13C:
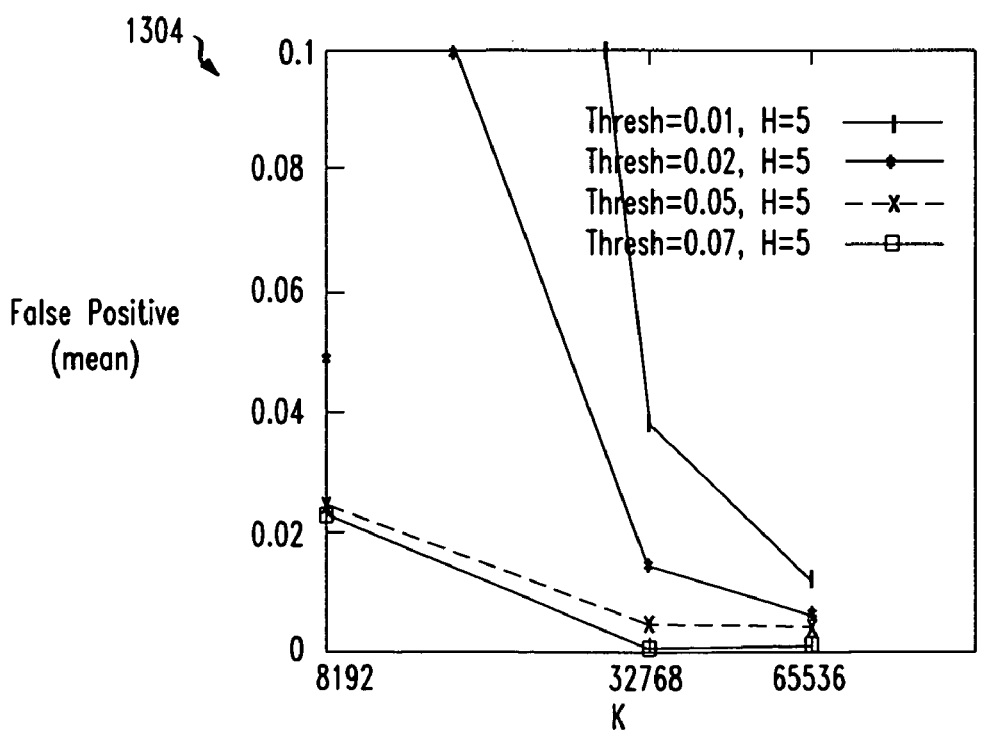

The similarity of sketch and per-flow results when flows are selected by thresholding were also considered. The overall summary here is that with K set to be at least 32000, one can provide excellent guarantees for low false negatives and false positives. This is shown in FIGS. 12 and 13 where large sized router data files and the Non-Seasonal Holt-Winters model were used for the 60 s (FIG. 12) and 300 s (FIG. 13) time intervals. Graph 1200 of FIG. 12 shows that for a very low value of H (=1), the number of alarms are very high. Simply increasing H to 5 suffices to dramatically reduce the number of alarms. The graph 1200 also demonstrates the significant reduction in number of alarms that can be realized by increasing the threshold value. Finally, it shows that there is virtually no difference between the per-flow results and the sketch results when H>5 and K>8000.

The graph 1202 of FIG. 12 shows that for K=32000 and beyond, the false negative ratio drops rapidly to be less than 2% even for very low threshold values and is below 1% for threshold of 0.05. The false positive ratio, as the graph 1204 of FIG. 12 shows, for K=32000 and even a low threshold of 0.02, is quite low (below 1%). The overall results are similar for the 300 second interval shown in corresponding graphs 1300, 1302 and 1304 of FIG. 13.

The graphs in FIGS. 14-17 use medium sized router data files, for a single interval size (300 s) and varies across four models: EWMA, Non-Seasonal Holt-Winters model, and ARIMA with d=0 and d=1. Only the false negative and false positive ratios are displayed.

Figure 14A:
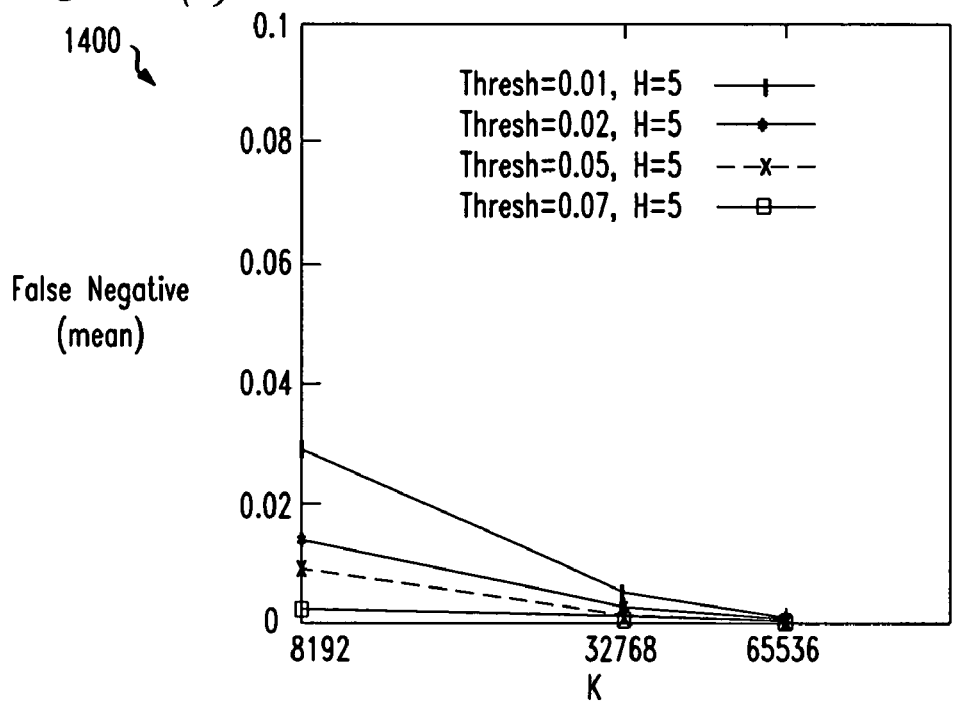
FIG. 14 depicts graphs of false negative ratio for EWMA and NSHW models used with the process of FIG. 2 as implemented on a medium sized router at a 300 second time interval.
Figure 14B:
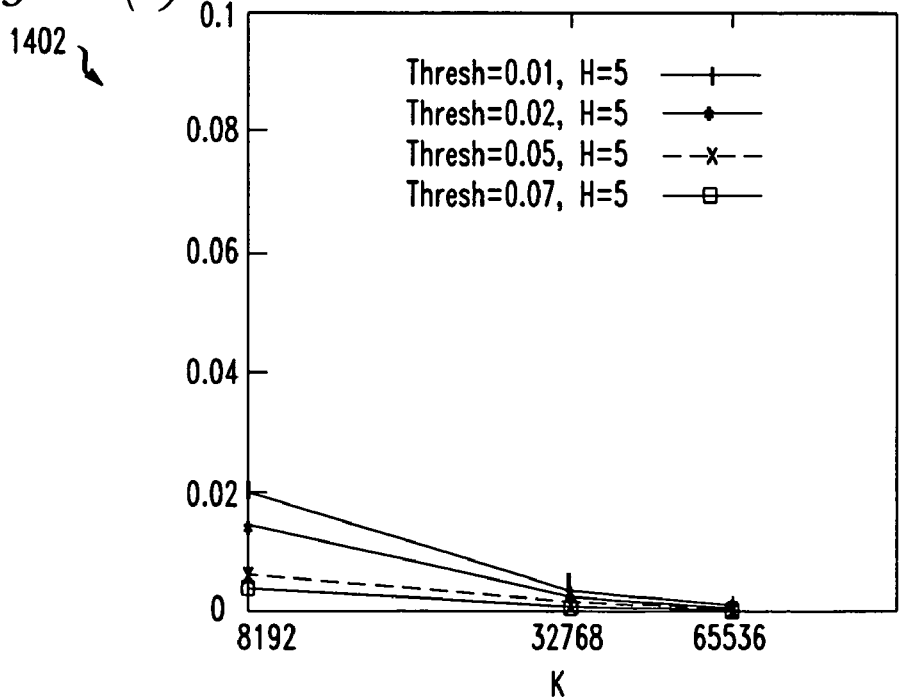

The graph 1400 of FIG. 14 shows the false negative ratio for the EWMA model to be well below 1% for thresholds larger than 0.01. Likewise, the graph 1402 of FIG. 14 shows the false negative ratio for the Non-Seasonal Holt-Winters model to be slightly better than the EWMA model.

Figure 15A:
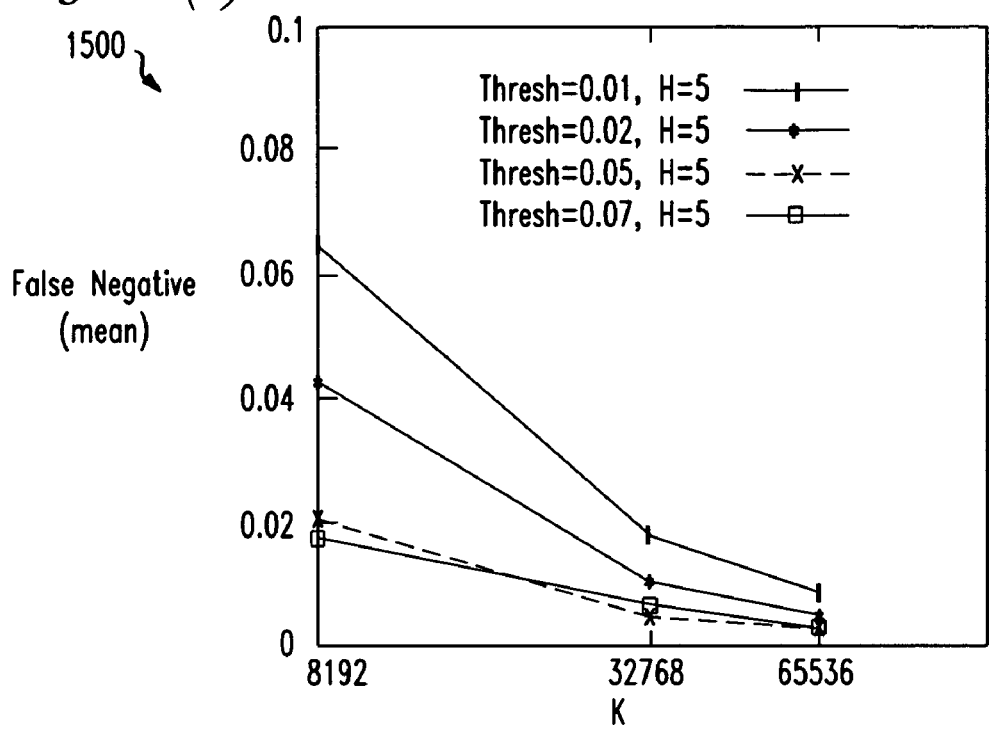
FIG. 15 depicts graphs of false negative ratios for differing ARIMA models used with the process of FIG. 2 as implemented on a medium sized router at a 300 second time interval.
Figure 15B:
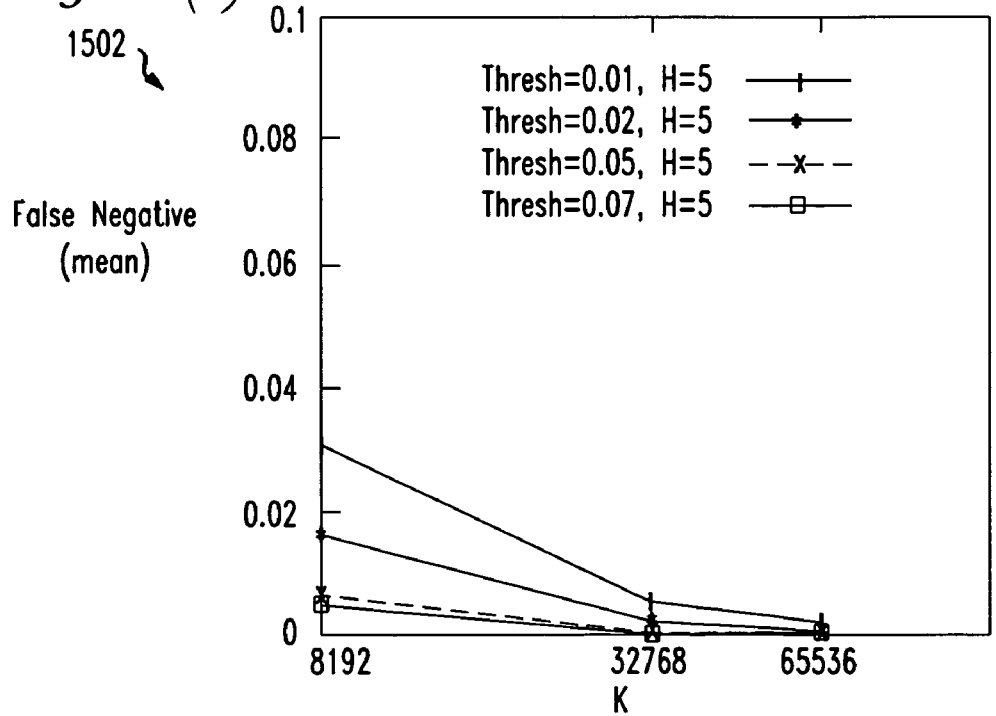

The graphs 1500 and 1502 of FIG. 15 show for the two different ARIMA models (d=0 and 1, respectively), that false negatives are low but differ a bit as compared to EWMA and NSHW models for a low threshold of 0.01.

Figure 16A:
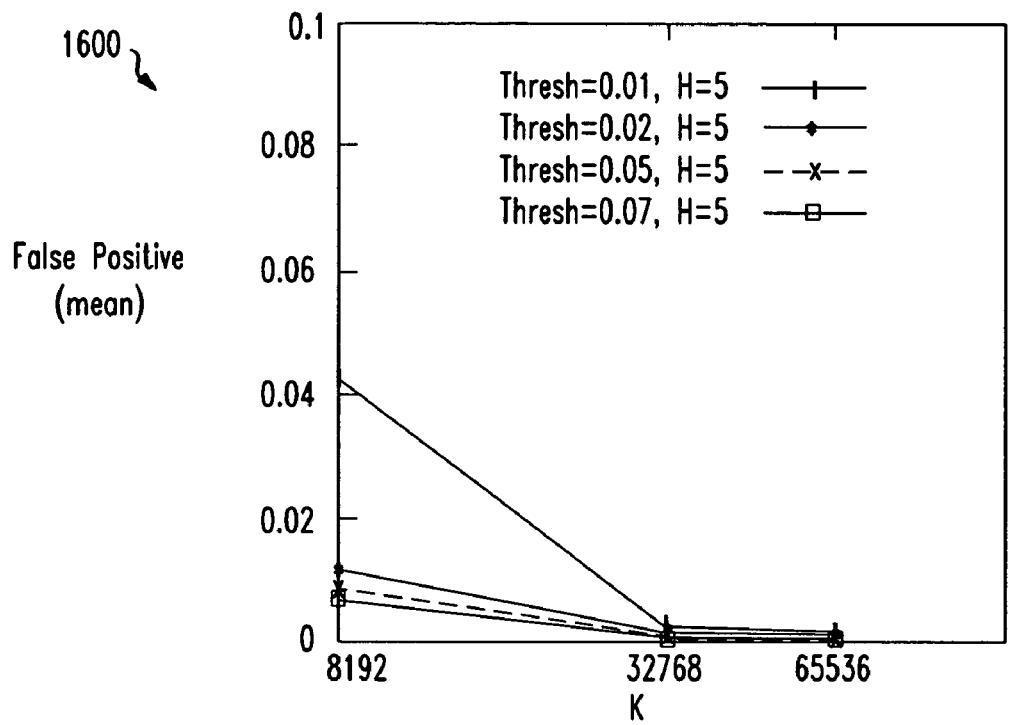
FIG. 16 depicts graphs of false positive ratios for the EWMA and NSHW models used with the process of FIG. 2 as implemented on a medium sized router at a 300 second time interval.
Figure 16B:
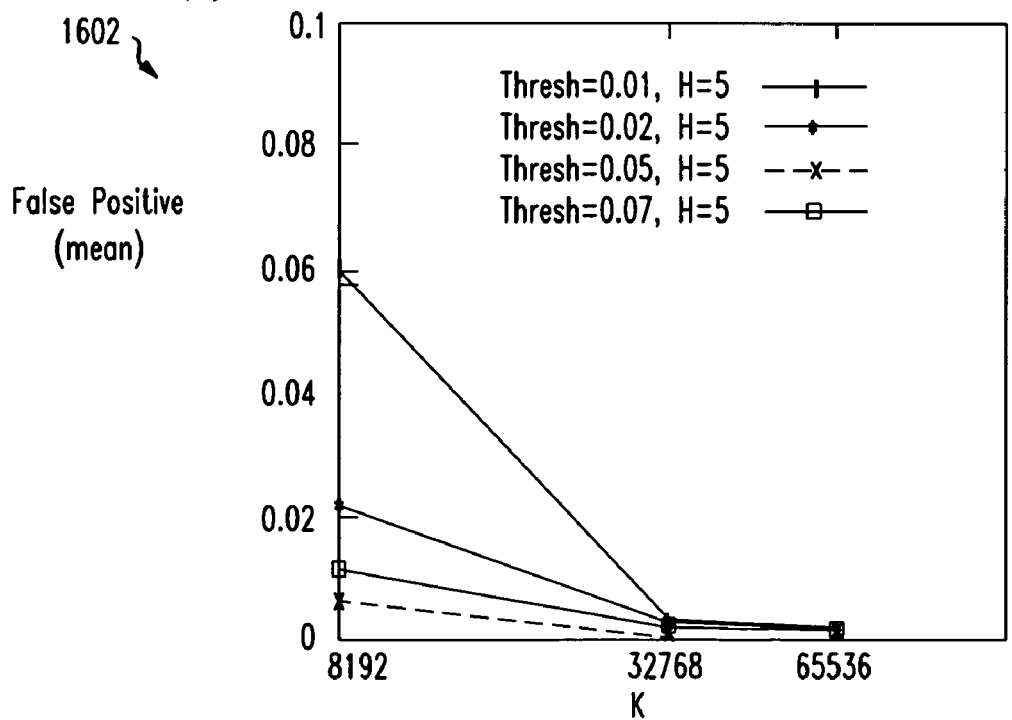

Graphs 1600 and 1602 of FIG. 16 show the false positive ratios for the EWMA and NSHW models respectively, to be well below 1% for thresholds larger than 0.01 for K=32000 or higher.

Figure 17A:
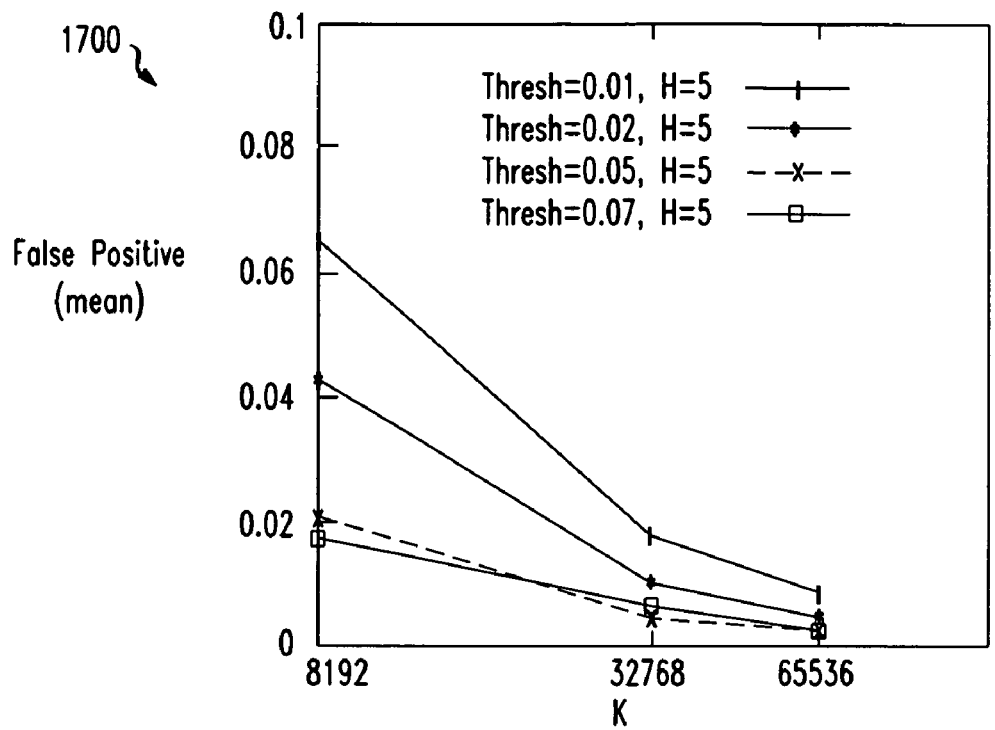
FIG. 17 depicts graphs of false positive ratios for differing ARIMA models used with the process of FIG. 2 as implemented on a medium sized router at a 300 second time interval.
Figure 17B:
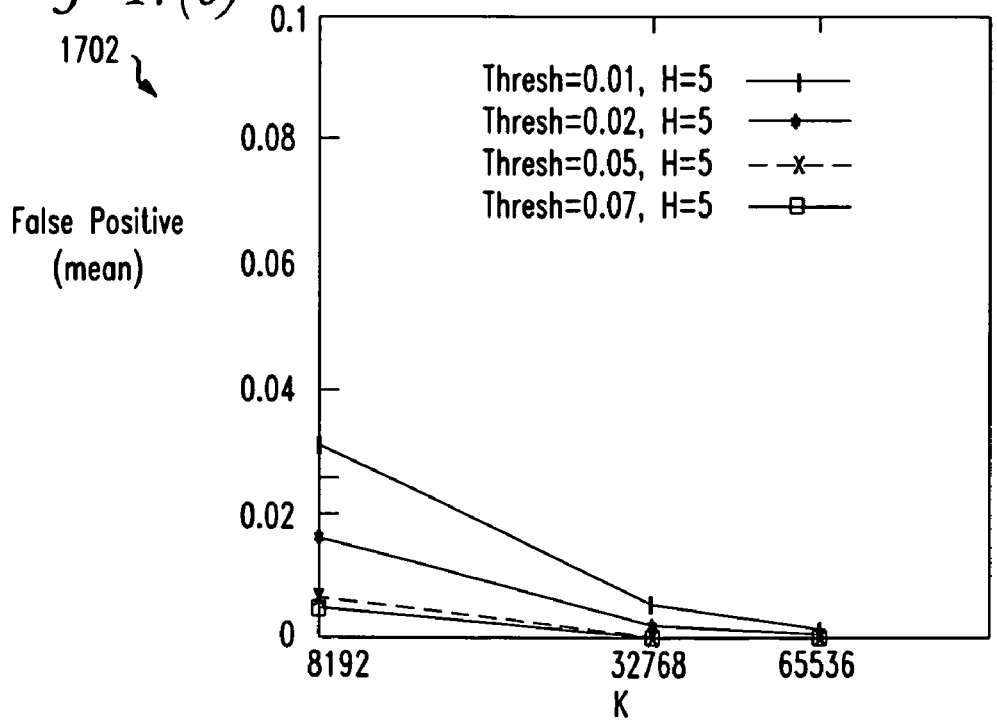

Likewise, the graphs 1700 and 1702 of FIG. 17 show low false positive ratios for ARIMA models d=0 and d=1, respectively.

There are three components in the sketch-based change detection implementation: 4-universal hash functions, sketches, and forecasting. The implementation of 4-universal hash functions can be accomplished with about 200 lines of programming code in the C programming language, while sketches will be around 250 lines. Forecasting code varies with the forecasting models used, but all of the models are each less than 800 lines of code.

Hash computation and sketch UPDATE need to be done on every data item in the input stream. Sketch ESTIMATE, by default, also needs to be done on a per-item basis. However, if it is acceptable to miss some keys that appear too infrequently (which arguably can only cause limited damage), one can sample the stream of incoming keys and only do ESTIMATE on select sub-streams. Operations like ESTIMATEF2 only need to be done infrequently—once every interval—and their amortized costs are insignificant.

Running time for performing 10 million hash computations and sketch operations on "computer A" (a 400 Megahertz (MHz) SGI R12k processor running IRIX64 6.5) and "computer B" (a 900 MHz ULTRASPARC-III processor running SOLARIS 5.8) are shown in the table of FIG. 18. Each hash computation produces 8 independent 16-bit hash values and therefore suffices for k-ary sketches with $H \leq 8$ and $K \leq 2^{16}$. Both UPDATE and ESTIMATE assume the hash values have already been computed (which needs to done only once per item). The sketch parameters we use are H=5 and K=$2^{16}$. As shown therein, the overhead of these operations are not very high.

The sketch-based change detection process 200 is highly accurate when compared with per-flow time series analysis as described in the foregoing. It offers promise to be a building block for network anomaly detection and traffic measurement.

In further embodiments, the sketch-based technique may be capable of near real-time change detection by modifying it to obtain the forecast model parameters online. One possible way is periodically re-computing the forecast model parameters using history data to keep up with changes in overall traffic behavior.

In additional embodiments, boundary effects due to fixed interval sizes may be avoided. Possible solutions include (i) simultaneously running multiple models using different interval sizes and different starting points, and (ii) randomizing the interval size (e.g., using exponentially distributed interval size) and detecting changes of total values normalized by interval size. The linearity of sketches makes both of these solutions possible.

Accurate detection of significant deviation from normal traffic behavior is a significant goal. However, some traffic anomalies are benign. The problem of reducing false alarms is a major challenge for all change-detection based network anomaly detection systems. The sketch-based change detection framework introduced in the foregoing has tunable parameters, which can be adjusted to limit the false positives. For instance, the technique can be programmed to only report the top N major changes, or the changes that are above a threshold. The particular application needs will guide the actual setting of these tunable parameters. The alarm condition may be triggered and reported by any standard means available to a computing system, such as by dispatching an e-mail, instant message or any other notification (such as by telephone or pager) to appropriate network administration personnel.

Given the massive volumes of data generated in large networks, sampling is increasingly being used in ISP network measurement infrastructures for reducing the volume of data that has to be collected. The approach introduced herein combines time series analysis with sketches for scalable change detection in massive data sets. Sampling techniques may also be combined with the process 200 for increased scalability.

Given the wide range of parameters available, it would be useful to have reasonable guidance for selecting proper and justifiable values for them. The full factorial method in the statistical experimental design domain can help in narrowing the number of levels (or "versions") for the various variables. Such techniques may yield those parameters that are independent of each other and move towards identifying reasonable values overall based on the similarity. For example, H has overall impact independent of other parameters. The tedium related to having multiple runs can also be reduced for example by using a Yates algorithm.

Proofs alluded to above will now be presented. Notation: For any $v_a^{h_i}$, let a~b denote h(a)=h(b), a≁b denote h(a)≠h(b).

ANALYSIS FOR VA ESTIMATION (Accuracy of $v_a^{h_i}$): Theorem 1 below states that each $v_a^{h_i}$(i∈[H]) is an unbiased estimator of $v_a$ with variance inversely proportional to (K−1).

$$E[v_a^{h_i}] = v_a$$

$$\mathrm{Var}[v_a^{h_i}] \le \frac{F_2}{K-1}$$

PROOF. For any h∈{$h_0, \ldots, h_{H-i}$}, we have:

$$v_a^h = \frac{\sum_{b \sim a} v_b - (1/K) \cdot \sum_b v_b}{1 - 1/K}$$

$$= \sum_{b \sim a} v_b - \frac{1}{K-1} \sum_{b \not\sim a} v_b$$

$$= v_a + \sum_{b \sim a \wedge b \ne a} v_b - \frac{1}{K-1} \sum_{b \not\sim a} v_b$$

Define:

$$X_{a,b} = \begin{cases} 1 & \text{if } b \sim a \\ -\frac{1}{K-1} & \text{otherwise} \end{cases}$$

and $v_a^h$ becomes:

$$v_a^h = v_a + \sum_{b \ne a} v_b X_{a,b}$$

Since h is 4-universal, for any distinct a, b∈[u], we have:

$$E[X_{a,b}] = 0$$

$$E\, X_{a,b}^2 = \frac{1}{K-1}$$

In addition, for any distinct a, b, c∈[u], we have:

$$E[X_{a,b} X_{a,c}] = 0$$

Now we are ready to prove the theorem:

$$E[v_a^h] =_1 v_a + \sum_{b \ne a} v_b E[X_{a,b}] = v_a$$

$$\mathrm{Var}[v_a^h] = E\, v_a^{h\,2} - E[v_a^h]^2$$
$$= E\left[\left(\sum_{b \ne a} v_b X_{a,b}\right)^2\right]$$
$$= \frac{1}{K-1} \sum_{b \ne a} v_b^2 \le \frac{F_2}{K-1}$$

$v_a^{est}$ further improves accuracy by avoiding the extreme estimates. Theorems 2 and 3 below summarize the accuracy guarantee of $v_a^{est}$.

THEOREM 2

For any a∈[u], T∈(0, 1), and α∈[1,∞), if $|v_a| \ge \alpha T\sqrt{F_2}$, then:

$$Pr\{|v_a^{est}| \le T\sqrt{F_2}\} \le \frac{4}{(K-1)(\alpha-1)^2T^2}^{H/2}$$

Proof: For any h∈{$h_0, \ldots, h_{H-i}$}, by the Chenyshev inequality, we have:

$$Pr\{|v_a^h| \le T\sqrt{F_2}\} \le$$
$$Pr\{|v_a^h - v_a| \ge |v_a| - T\sqrt{F_2}\} \le Pr\{|v_a^h - v_a| \ge (\alpha-1)T\sqrt{F_2}\} =$$
$$Pr\{|v_a^h - E[v_a^h]| \ge (\alpha-1)T\sqrt{F_2}\} \le \frac{Var\ v_a^h}{(\alpha-1)T\sqrt{F_2}^2}$$
$$(\text{Chebyshev Inequality}) \le \frac{F_2/(K-1)}{[(\alpha-1)T]^2F_2} = \frac{1}{(K-1)(\alpha-1)^2T^2}$$

Since $v_a^{est}$ is obtained by taking the median of H copies of $v_a^h$, by the Chernoff inequality, we immediately have the results of Theorem 2.

THEOREM 3. For any a∈[u], T∈(0,1), and β∈[0,1], if $|v_a| \le \beta T\sqrt{F_2}$, then:

$$Pr\{|v_a^{est}| \le T\sqrt{F_2}\} \le \frac{4}{(K-1)(1-\beta)^2T^2}^{H/2}$$

PROOF. The proof is almost identical and is omitted here in the interest of brevity.

As an example, let $K=2^{16}$, K=2, 2=0.5, T=1/32, and H=20. If we raise an alarm whenever $v^a_{est} \ge \sqrt{F_2}/32$, then according to Theorem 2, the probability that we will miss a $v_a > \sqrt{F_2}/16$ is less than $9.0 \times 10^{-13}$; according to Theorem 3, the probability that we will falsely raise an alarm for a $v_a < \sqrt{F_2}/64$ is less than $9.5 \times 10^{-7}$.

ANALYSIS FOR $F_2$ ESTIMATION (Accuracy of $F_2$): Theorem 4 below shows that each $F_2^{hi}$ forms an unbiased estimator of $F_2$ with variance inversely proportional to (K−1). In order to achieve the same variance using count sketch, one has to either live with lower speed or double the memory requirement.

$$E[F_2^{hi}] = F_2$$
$$Var[F_2^{hi}] \le \frac{2}{K-1}F_2^2$$

$F_2^{est}$ further improves accuracy by avoiding the extreme estimates. Theorem 5 provides the accuracy guarantee of $F_2^{est}$.

$$Pr\{|F_2^{est} - F_2| > \lambda F_2\} \le \frac{8}{(K-1)\lambda^2}H/2$$

Proof By Theorem 4 and the Chebyshev inequality, $$Pr\left\{\left|F_2^{R_2} - F_2\right| > \lambda F_2\right\} \le \frac{Var[F_2^{R_2}]}{(\lambda F_2)^2} \le \frac{2F_2^2/(K-1)}{(\lambda F_2)^2} = \frac{2}{(K-1)\lambda^2}$$

Since $F_2^{est}$ is the median of H copies Of $F_2$, by the Chernoff inequality, one immediately obtains the result in Theorem 5.

As an example, let $K=2^{16}$, 9=0.05, and H=20, Theorem 5 states that the probability that the estimate $F_2^{est}$ is 5% off its real value $F_2$ is below $7.7 \times 10^{-14}$.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for detecting anomalous traffic flow, comprising:
   generating a sketch at a network device, wherein the sketch is a probabilistic summary technique analyzing incoming data flow received at the network device;
   calculating a time series forecast of the sketch including a corresponding forecast error at the network device;
   indicating an alarm condition at the network device when the forecast error is greater than an established threshold; and
   using the alarm condition for network anomaly detection at the network device,
   wherein the sketch comprises a k-ary sketch that uses a Turnstile model of the incoming data flow for identifying each data item in the incoming data flow by a key value and an update value, and the key value comprises a destination Internet Protocol (IP) address of the data item.

2. The method of claim 1, the calculating further comprising:
   calculating the time series forecast using an AutoRegressive Integrated Moving Average (ARIMA) time series forecast model that includes an autoregressive parameter (p), a number of differencing passes parameter (d) and a moving average parameter (q).

3. The method of claim 2, wherein $p \le 2$, $d=0$, $q \le 2$.

4. The method of claim 2, wherein $p \le 2$, $d=1$, $q \le 2$.

5. The method of claim 1, the calculating further comprising:
   calculating the time series forecast using a model that comprises a first parameter (H) including a number of hash functions applied to each data item, a second parameter (K) including a hash table size, and a third parameter including a time interval size.

6. The method of claim 5, wherein H comprises a value between 1 and 25 inclusive.

7. The method of claim 5, wherein K comprises a value between 1000 and 64000 inclusive.

8. The method of claim 5, wherein the third parameter comprises a value between 60 seconds and 300 seconds inclusive.

9. The method of claim 5, the calculating further comprising:
   selecting values for the first parameter, the second parameter and the third parameter that minimize a total residual energy of the forecast error.

10. The method of claim 1, the calculating further comprising:
    calculating the time series forecast using at least one of: a Moving Average model, an S-Shaped Moving Average model, an Exponentially Weighted Moving Average model and a Non-Seasonal Holt-Winters model.

11. The method of claim 1, wherein the forecast error is calculated as a difference between a forecast value generated by the time series forecast model and an observed value for each data flow.

12. The method of claim 1, wherein the established threshold is based on an estimated second moment of the forecast error.

13. The method of claim 1, the incoming data flow comprising a plurality of incoming data flows, the generating further comprising generating the sketch for each incoming data flow, the calculating further comprising calculating the time series forecast and the forecast error for each generated sketch, and the indicating further comprising indicating the alarm condition when any forecast error exceeds the established threshold.

14. The method of claim 1, wherein the update value comprises one of a packet size of the data item and a number of packets associated with the data item.

15. A method for detecting anomalous traffic flow, comprising:
    generating a sketch at a network device, wherein the sketch is a probabilistic summary technique analyzing incoming data flow received at the network device;
    calculating a time series forecast of the sketch including a corresponding forecast error at the network device;
    indicating an alarm condition at the network device when the forecast error is greater than an established threshold; and
    using the alarm condition for network anomaly detection at the network device,
    wherein the sketch comprises a k-ary sketch that uses a Turnstile model of the incoming data flow for identifying each data item in the incoming data flow by a key value and an update value, and the key value comprises at least one of: a source IP address of the data item, a port number associated with the data item, and a network prefix associated with the data item.

16. The method of claim 15, wherein the update value comprises one of a packet size of the data item and a number of packets associated with the data item.

17. A method for detecting anomalous traffic flow, comprising:
    generating a sketch at a network device, wherein the sketch is a probabilistic summary technique analyzing incoming data flow received at the network device;
    calculating a time series forecast of the sketch including a corresponding forecast error at the network device;
    indicating an alarm condition at the network device when the forecast error is greater than an established threshold; and
    using the alarm condition for network anomaly detection at the network device,
    wherein the sketch comprises a k-ary sketch that uses a Turnstile model of the incoming data flow for identifying each data item in the incoming data flow by a key value and an update value, and the update value comprises a packet size of the data item.

18. A method for detecting anomalous traffic flow, comprising:
    generating a sketch at a network device, wherein the sketch is a probabilistic summary technique analyzing incoming data flow received at the network device;
    calculating a time series forecast of the sketch including a corresponding forecast error at the network device;
    indicating an alarm condition at the network device when the forecast error is greater than an established threshold; and
    using the alarm condition for network anomaly detection at the network device,
    wherein the sketch comprises a k-ary sketch that uses a Turnstile model of the incoming data flow for identifying each data item in the incoming data flow by a key value and an update value, and the update value comprises a number of packets associated with the data item.

19. A non-transitory computer readable medium for implementing a method, performed by a computer, for detecting anomalous traffic flow, comprising:
    a sketch module for creating a k-ary sketch of an incoming data flow, the k-ary sketch identifying each data item in the incoming data flow by a key value and an update value, wherein the sketch is a probabilistic summary technique analyzing incoming data flow;
    a forecast module for generating a forecast sketch using a time series forecast model that includes a first parameter defining a number of hash functions applied to each data item, a second parameter defining a hash table size and a third parameter defining a time interval, the time series forecast model resulting in a forecast value, the forecast module further for calculating a forecast error comprising a difference between the forecast value and an observed value;
    a change detection module for establishing a threshold value based on an estimated second moment of the forecast error, and for indicating an alarm condition when the forecast error exceeds the threshold value, and for using the alarm condition for network anomaly detection.

* * * * *